US010997278B2

(12) United States Patent
Gupta et al.

(10) Patent No.: US 10,997,278 B2
(45) Date of Patent: May 4, 2021

(54) COMPUTING DEVICE USE RESTRICTION SYSTEM

(71) Applicant: Avast Software s.r.o., Prague (CZ)

(72) Inventors: Rajarshi Gupta, Los Altos, CA (US); Juyong Do, Cupertino, CA (US)

(73) Assignee: Avast Software, s.r.o., Prague (CZ)

( * ) Notice: Subject to any disclaimer, the term of this patent is extended or adjusted under 35 U.S.C. 154(b) by 304 days.

(21) Appl. No.: 16/235,427

(22) Filed: Dec. 28, 2018

(65) Prior Publication Data

US 2020/0210549 A1  Jul. 2, 2020

(51) Int. Cl.
*G06F 21/10* (2013.01)
(52) U.S. Cl.
CPC ...... *G06F 21/10* (2013.01); *G06F 2221/2111* (2013.01); *G06F 2221/2137* (2013.01); *G06F 2221/2149* (2013.01)
(58) Field of Classification Search
CPC ............. G06F 21/10; G06F 2221/2149; G06F 2221/2137; G06F 2221/2111; G06F 21/35
See application file for complete search history.

(56) References Cited

U.S. PATENT DOCUMENTS

| | | | |
|---|---|---|---|
| 2011/0035768 A1* | 2/2011 | Ling | G06F 21/10 725/28 |
| 2013/0124328 A1* | 5/2013 | Broadhead | G06Q 30/0257 705/14.66 |
| 2013/0227225 A1* | 8/2013 | Oliver | G06F 21/316 711/154 |
| 2016/0140618 A1* | 5/2016 | Duggal | G06Q 30/0269 705/14.66 |
| 2016/0300388 A1* | 10/2016 | Stafford | A63F 13/211 |
| 2018/0063857 A1* | 3/2018 | Caplan | H04N 21/64784 |

\* cited by examiner

*Primary Examiner* — Meng Li
(74) *Attorney, Agent, or Firm* — Dovas Law, P.C.

(57) ABSTRACT

A device control method includes monitoring location of a first user device of a first user and receiving an indication of a location of a second user device. The method further includes monitoring use of the second user device and determining a first time of use on the second user device. The first time of use on the second user device is allocated to a use time of a second user based on the location of the first user device relative to the location of the second user device, and a functional component of a third user device of the second user is disabled based at least on the use time of the second user.

24 Claims, 14 Drawing Sheets

COMPUTING DEVICE USE RESTRICTION SYSTEM

FIELD OF INVENTION

The invention relates generally to computing device control, and more particularly to restricting computing device use.

BACKGROUND

A challenge for those tasked with supervising the amount of use of computing devices by device users is that a particular user may have access to many different computing devices. Parents for example often endeavor to limit the amount of time their children spend on various computing devices including personal computers, tablets, cellular mobile devices, video game consoles, televisions and electronic media players. When multiple computing devices are accessible to a particular user, managing access or screen time by a supervisory user is more challenging. Moreover, a particular computing device may be accessible to multiple users in some environments further complicating the management of access or screen time. For example, televisions, personal computers, video game consoles, tablet computers and electronic media players may be located in a common area of a home or portable such that they can be used by multiple users at different times or simultaneously.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method of controlling use of network-connectable devices is provided. The method includes receiving from a plurality of user devices a plurality of network destinations accessed by the plurality of user devices which information is combined with received ages of users of the plurality of user devices. A first classifier is trained based on the plurality of network destinations and the ages of the users. An age of a particular user of a particular user group is received. A first user device is monitored via a first application executed by a processor of the first user device, the first user device assigned to the particular user group. Alternatively, the user device can be monitored by a router or network box including a router, or a cloud-based system such as a Domain Name System (DNS) gateway. A first time of use on the first user device and first network destinations accessed by the first user device are determined via the first application. The first classifier is applied to the first network destinations to determine a first age range, and the first age range is compared with the age of the particular user to determine the age of the particular user is within the first age range. A use time of the particular user is determined based on the first time of use on the first user device and the determining the age of the particular user is within the first age range. A functional component of the first user device is disabled based on the use time of the particular user, for example based on the use time exceeding a particular threshold. Disabling can be performed for example by the first application executed on the first user device or alternatively by a router or network box or by a cloud-based system such as a Domain Name System (DNS) gateway.

The above control method can further include monitoring a second user device via a second application executed by a processor of the second user device, the second user device assigned to the particular user group, and determining via the second application a second time of use on the second user device and second network destinations accessed by the second user device. The first classifier is applied to the second network destinations to determine a second age range at least one of equal to or overlapping with the first age range, and the second age range is compared with the age of the particular user to determine the age of the particular user is within the first age range. The use time of the particular user can be determined further based at least on the second time of use on the second user device and the determining that the age of the particular user is within the second age range, for example adding the second time of use on the second user device to an existing use time of the particular user. The determined use time includes an estimated screen time of the particular user, wherein for example determining the use time of a particular user includes incrementing an amount of screen time for the particular user each time the particular user is determined to use one of multiple user devices assigned to a particular user group (e.g., a family), the increment including the time of use on one or more devices including shared user devices and devices assigned exclusively to the particular user.

Further provided is another method of controlling use of network-connectable computing devices. The method includes receiving identifying information of a plurality of users and detecting on a plurality of user devices of the plurality of users a plurality of network destinations accessed by the plurality of user devices and a plurality of times of use of the plurality of user devices. One or more classifiers are trained based on the plurality of network destinations of the plurality of user devices, the plurality of times of use of the plurality of user devices, and the identifying information of the plurality of users of the plurality of user devices. A particular time of use on a shared device and a particular network destination of the particular time of use is detected on the shared device. The method further includes detecting on a certain user device of the plurality of user devices a certain time of use on the certain user device and applying the one or more classifiers to the particular time of use, the particular network destination, an identification of the certain user device, and the certain time of use on the certain user device to determine an identity of a particular user of the plurality of users using the shared device at the particular time of use. A use time of the particular user is determined based on the particular time of use detected on the shared device, and a functional component of a particular user device of the plurality of user devices of the particular user is disabled based on the use time of the particular user.

Further provided is yet another method of controlling use of network-connectable computing devices, the method including monitoring location of a first user device of a first user and receiving an indication of a location of a second user device. The method further includes monitoring use of the second user device and determining a first time of use on the second user device. The first time of use on the second user device is allocated to a use time of a second user based on the location of the first user device relative to the location of the second user device. A functional component of a third user device of the second user is disabled based at least on the use time of the second user.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

Figure 5A:
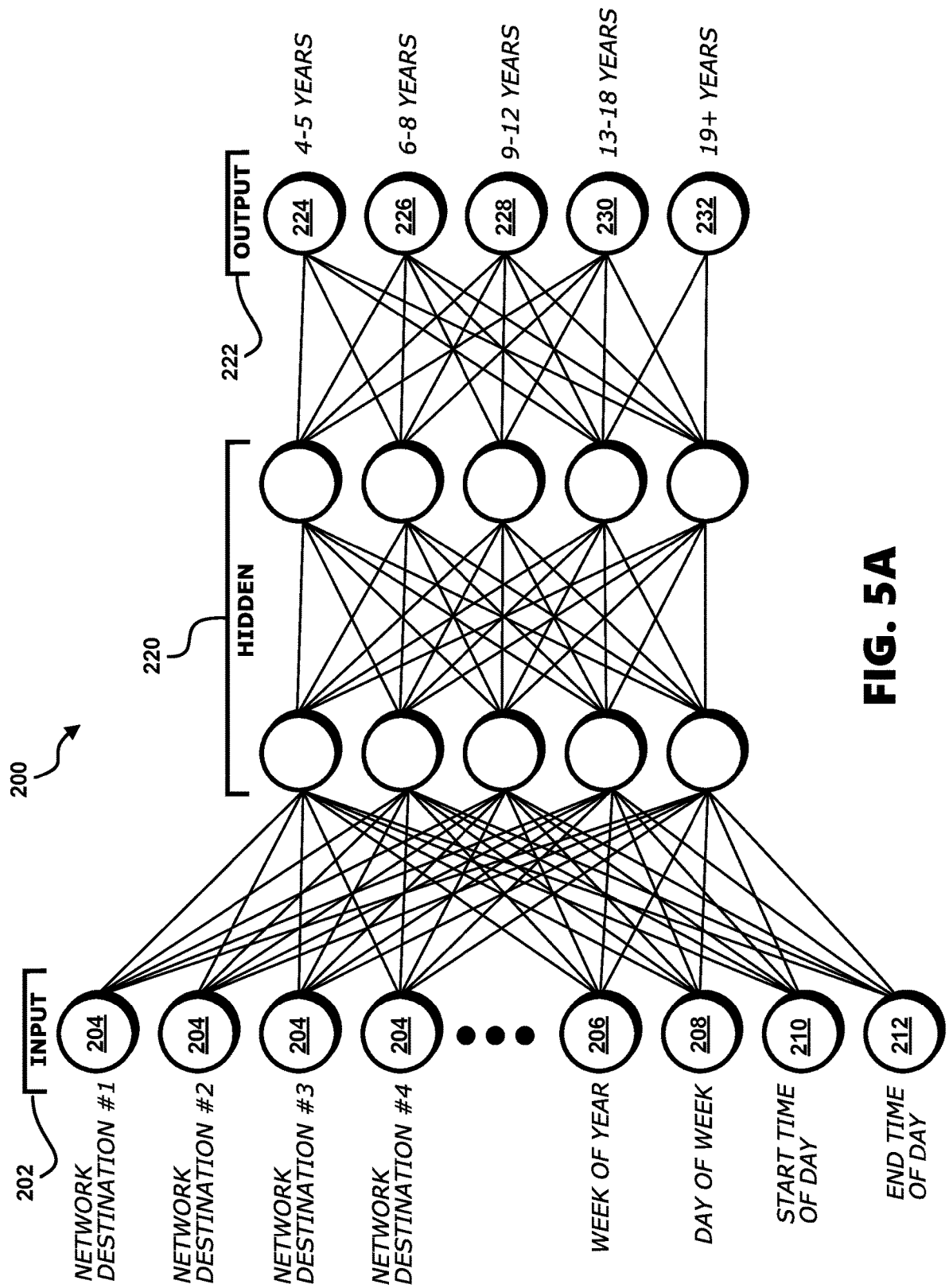
Figure 5B:
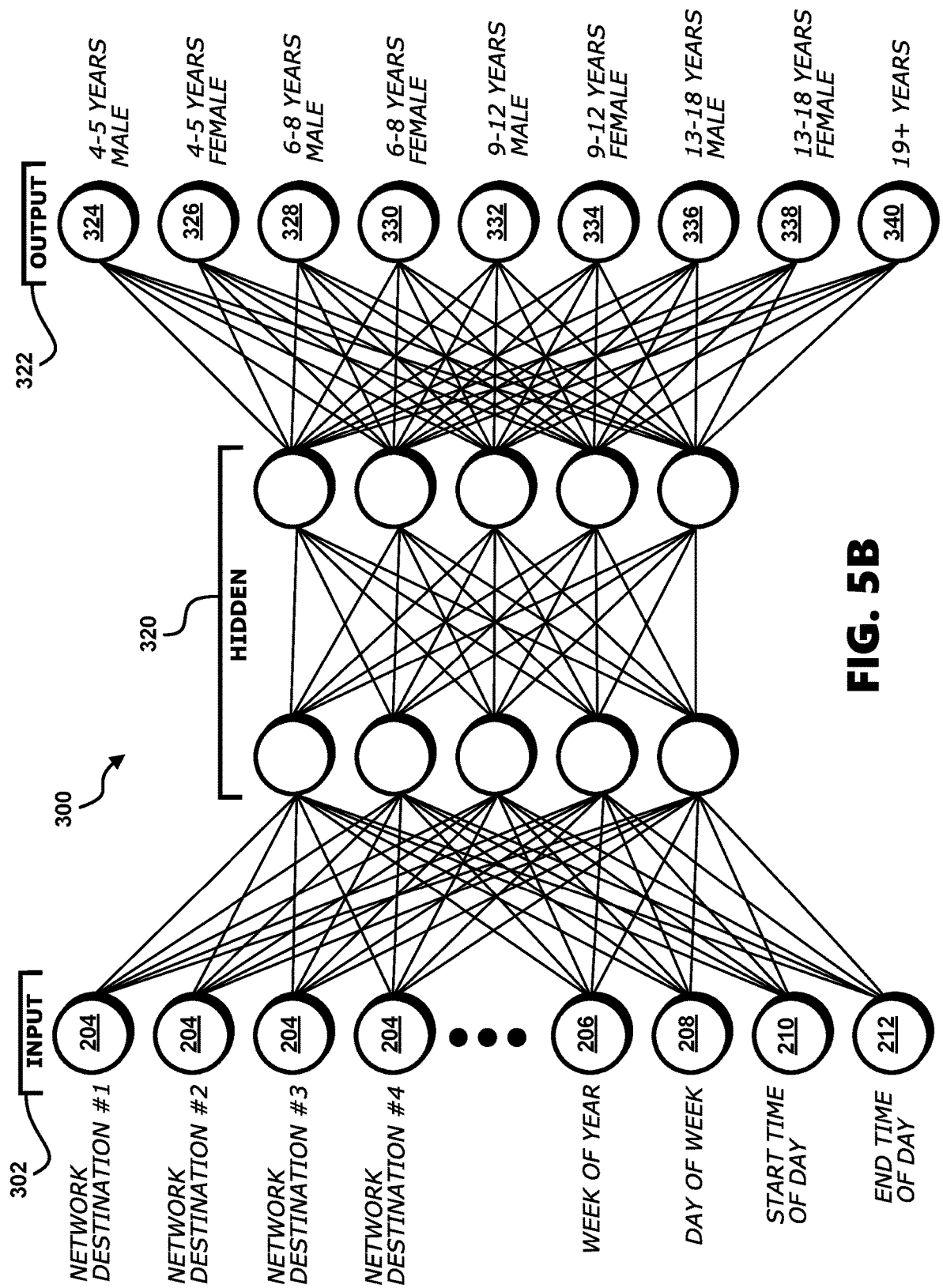
Figure 5C:
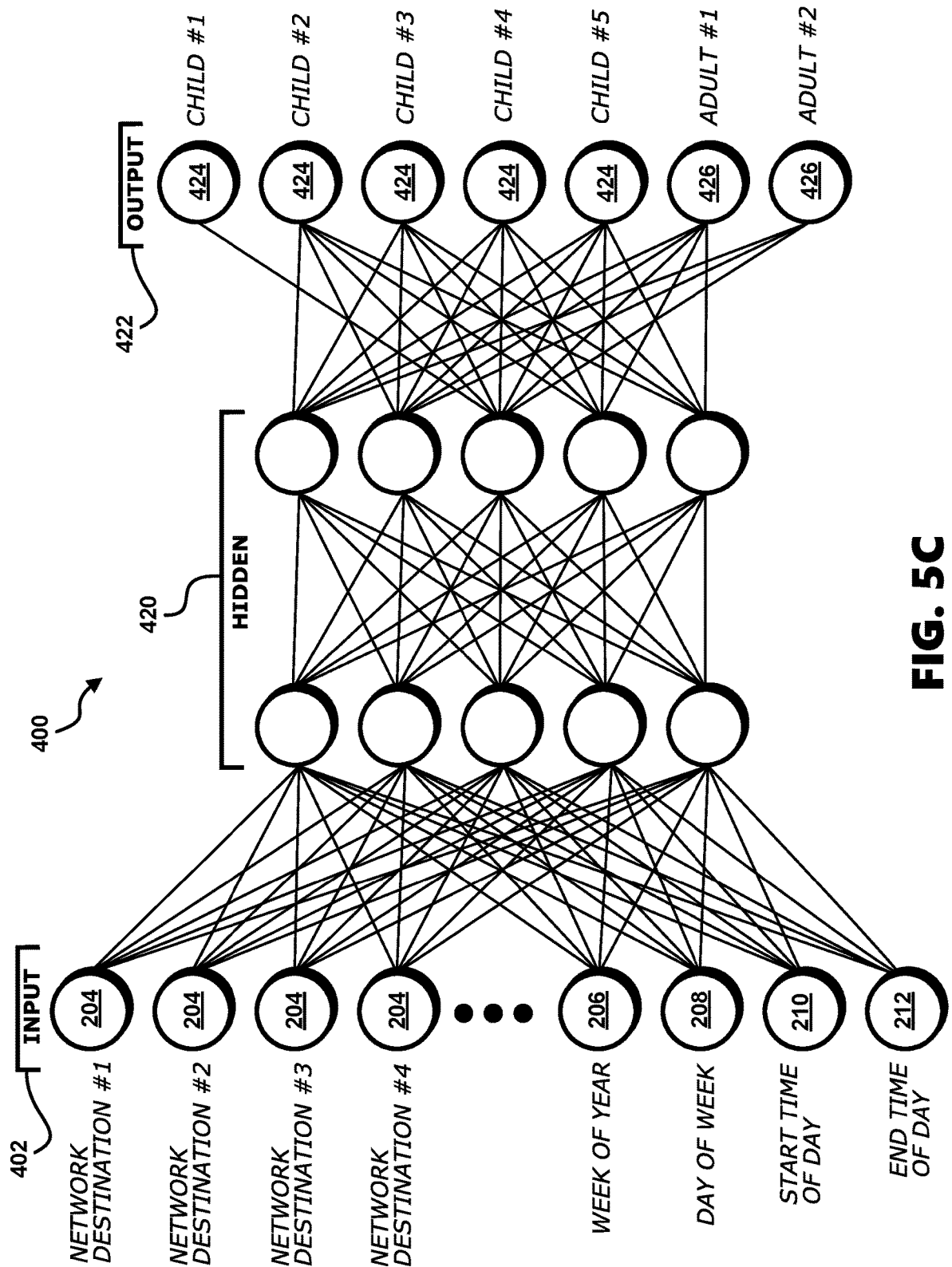

FIGS. 5A, 5B, and 5C are diagrams figuratively showing classifiers in the form of artificial neural networks for identifying computing device users based on computing device use.

FIGS. 6-10 are flow charts showing methods for identifying computing device users and controlling computing devices.

Figure 11:
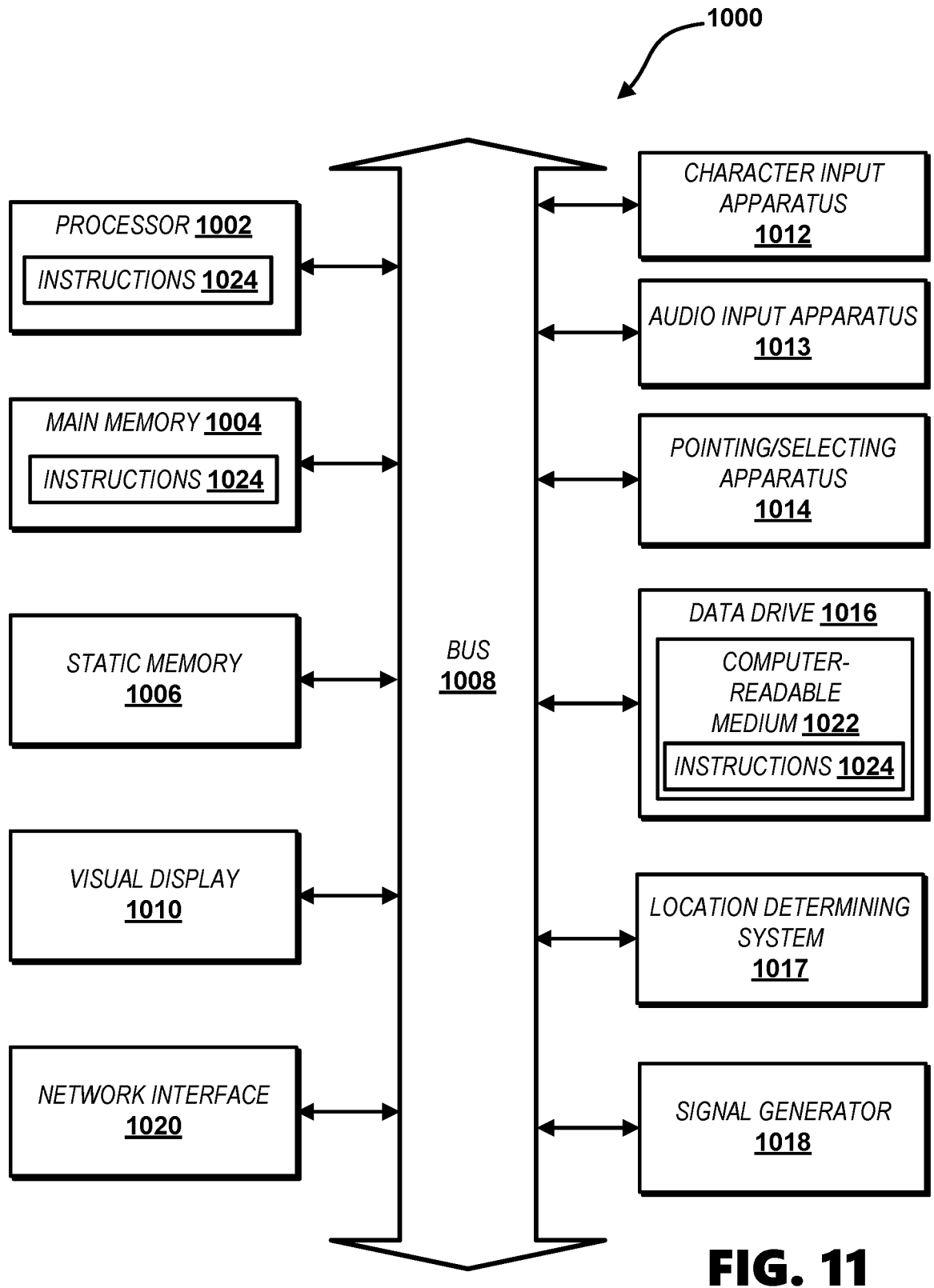

FIG. 11 is an illustrative computer system for performing described computing device control methods according to the illustrative embodiments.

DETAILED DESCRIPTION OF ILLUSTRATIVE EMBODIMENT(S)

Embodiments of the invention are described below with reference to the drawing figures wherein like numerals represent like elements throughout. The terms "a" and "an" as used herein do not denote a limitation of quantity, but rather denote the presence of at least one of the referenced items. Any directional signal such as top, bottom, left, right, upper and lower are taken with reference to the orientation in the various figures.

Figure 1:
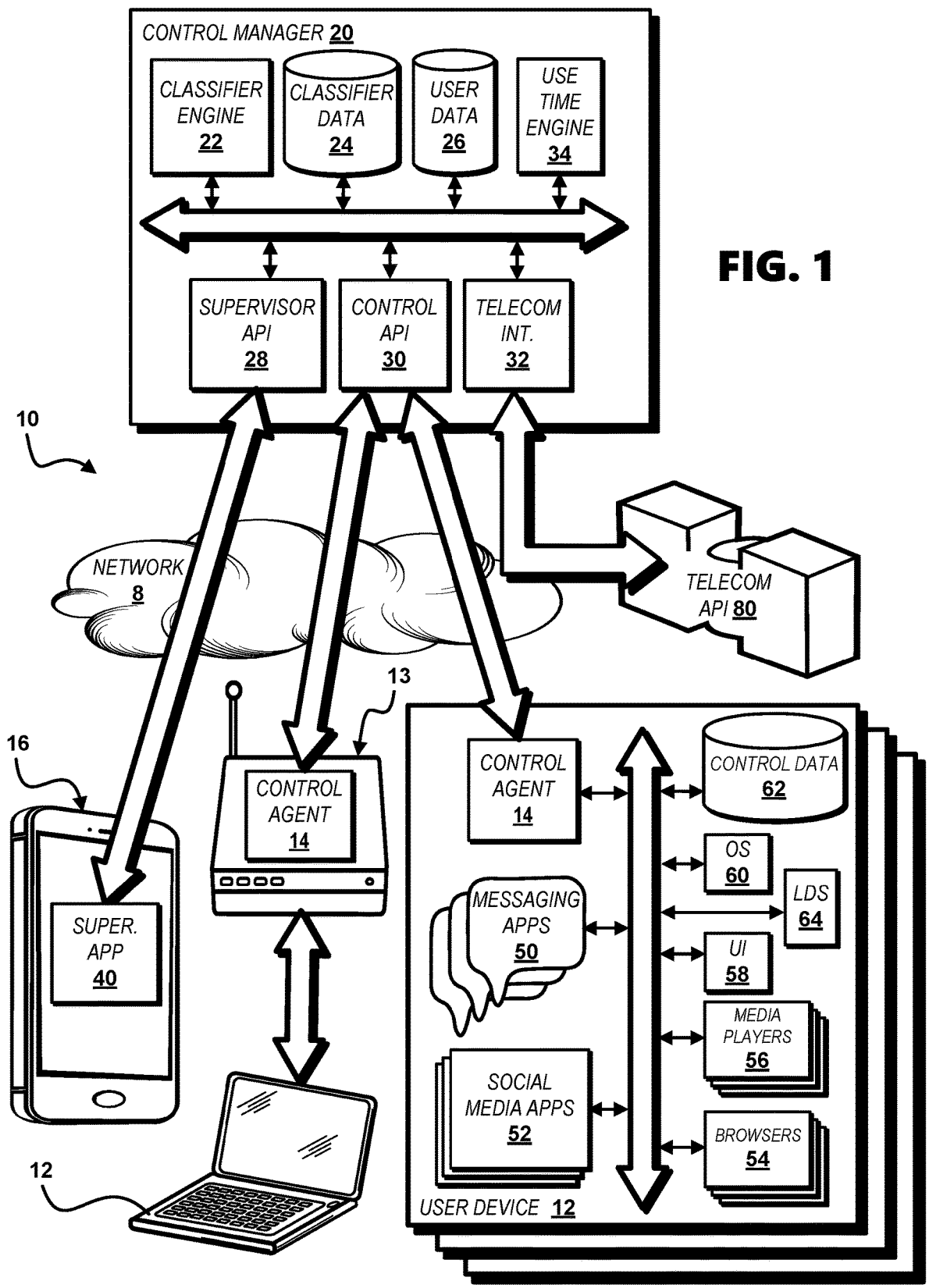
FIG. 1 shows a system enabling the identifying of computing device users and the controlling of computing devices according to the illustrative embodiments.
Figures 2A, 2B, 2C:
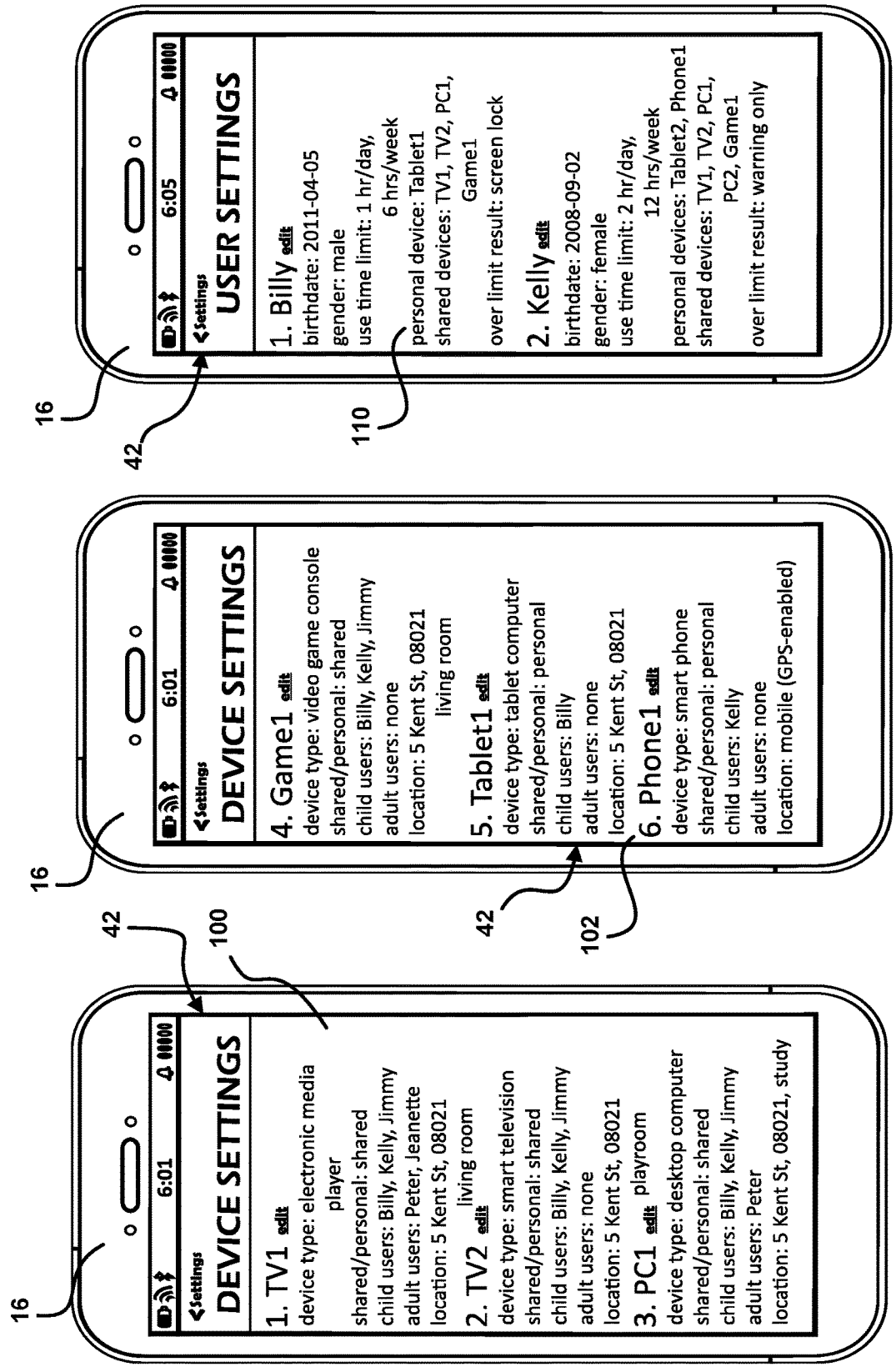
FIGS. 2A-2E show example interactive displays for entering and editing control settings for controlling computing devices.
Figures 2D, 2E:
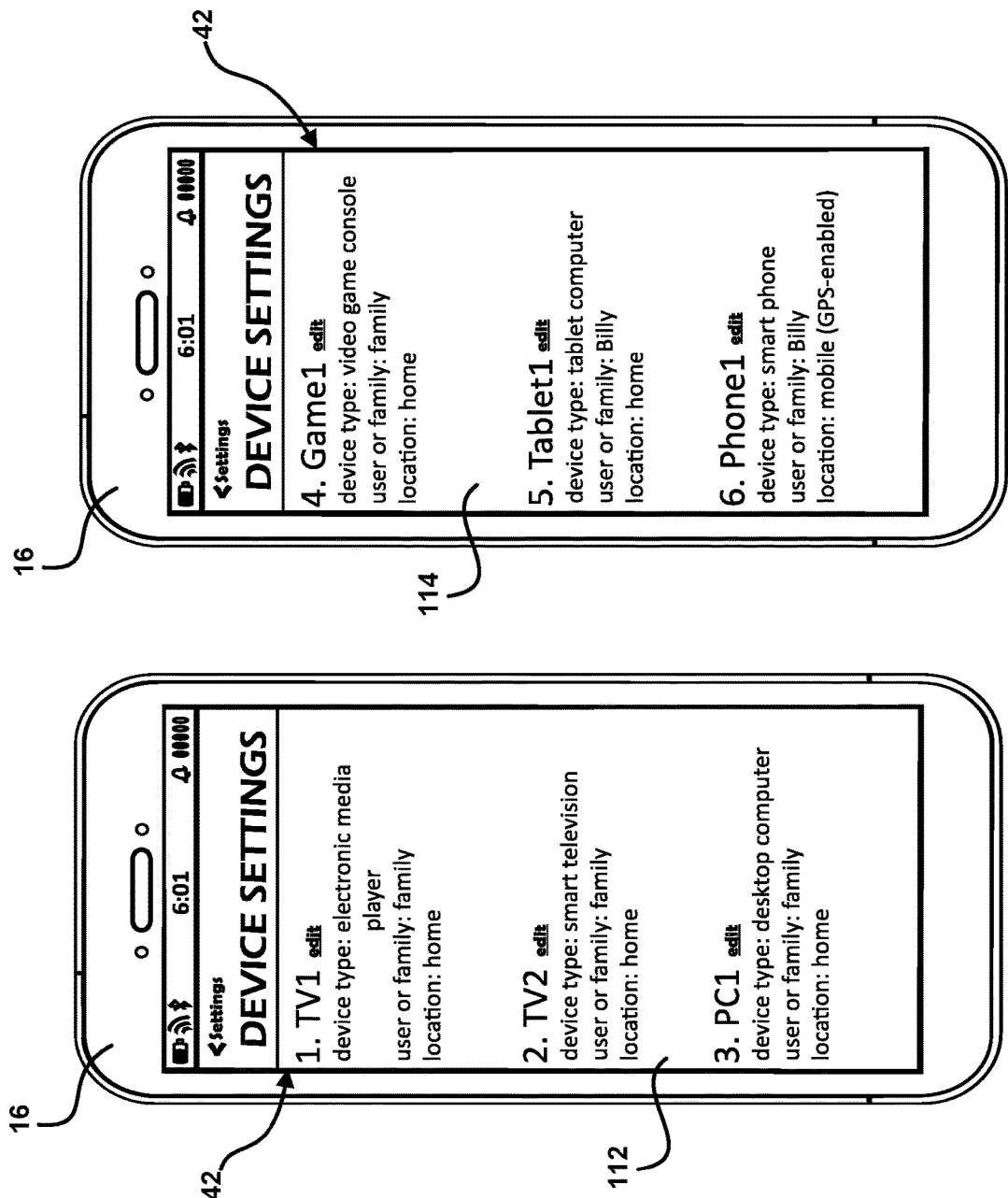
Figure 3A:
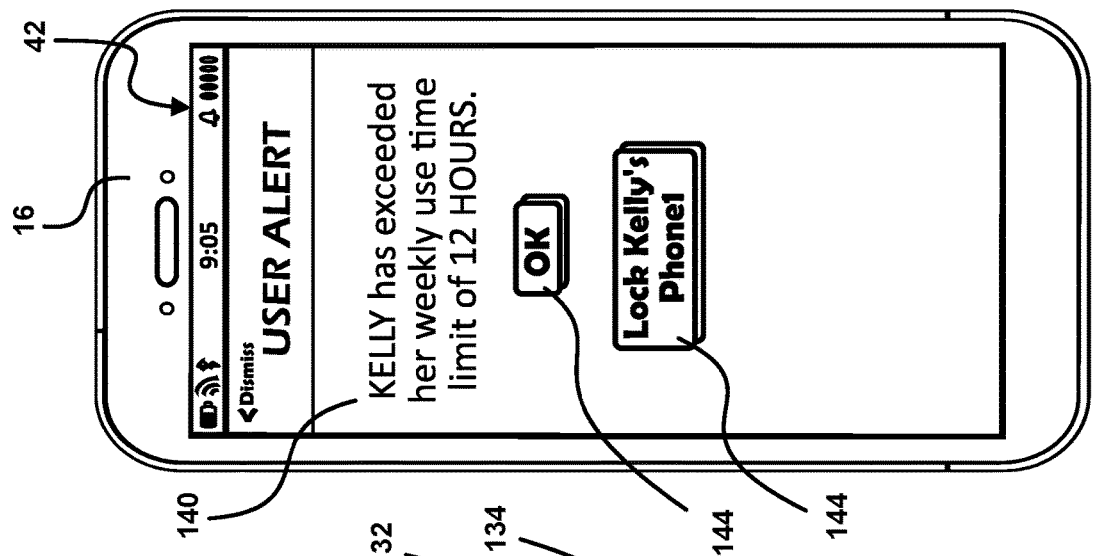
FIGS. 3A-3D and 4A and 4B show example interactive displays for providing alerts regarding controlled computing devices and permitting user feedback.
Figure 3B:
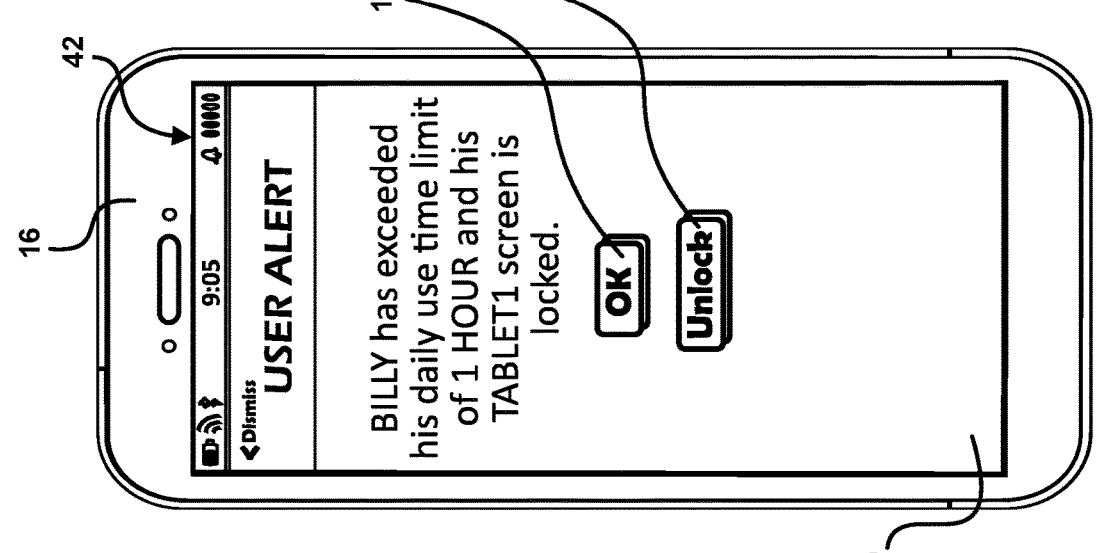
Figure 3C:
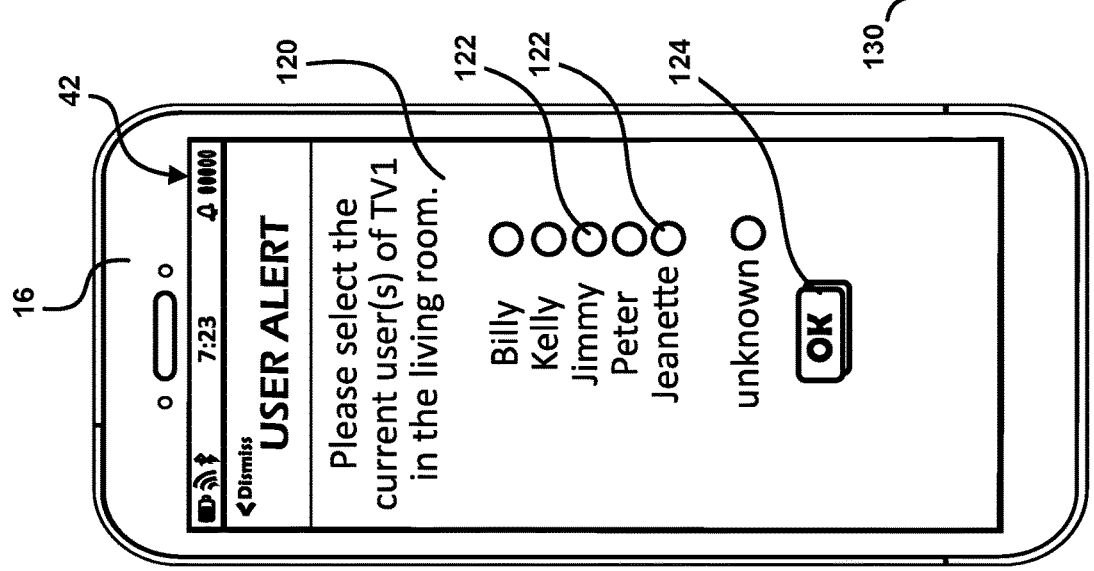
Figure 3D:
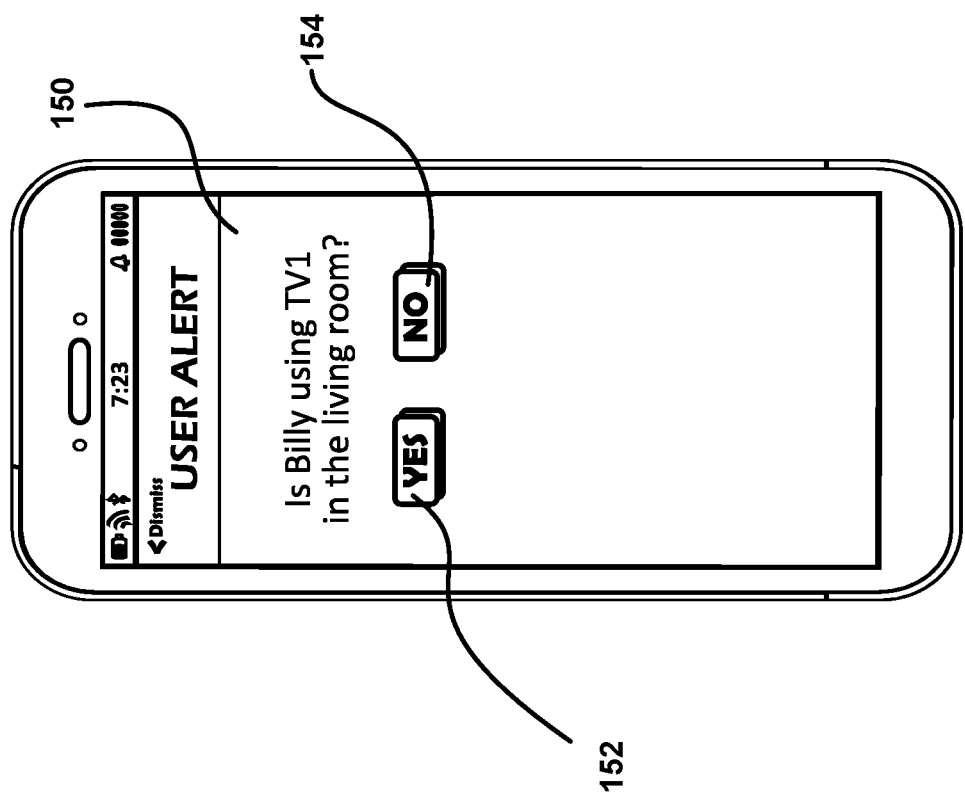

Referring to FIG. 1, a system 10 for enabling control of a computing device 12 (hereinafter "user device 12") is provided in a communications network 8 including one or more wired or wireless networks or a combination thereof, for example including a local area network (LAN), a wide area network (WAN), the Internet, mobile telephone networks, and wireless data networks such as WiFi™ and 3G/4G/5G cellular networks. The system 10 permits a supervisory user operating another computing device 16 (hereinafter "supervisor device 16") to set controls for a plurality of user devices 12 operated by a supervised user, for example a child of a parent supervisory user.

The user devices 12 and supervisor device 16 operate in the network 8, which devices can be mobile and as such can be located in different geographic areas. The user devices 12 and supervisor device 16 can each include for example a smart phone or other cellular-enabled mobile device configured to operate in a wireless telecommunications network. Alternatively, the user devices 12 and supervisor device 16 can each include a personal computer, tablet device, video game console, television controller, set-top box, digital media player or other computing device. User devices 12 can be assigned to a particular user, as is typical for example with mobile phone, or shared among more than one user, as is typical with video game consoles, television controllers, and set-top boxes. Data indicating whether a particular user device 12 is shared or assigned to a particular user can be received from a supervisory user via the supervisor application 40 and stored in the user datastore 26.

A user operates a user device 12 with a control agent 14 active. Software and/or hardware residing on the user device 12 enables the control agent 14 to monitor and restrict use of the user device 12 and content accessible by the user device 12. Software and/or hardware residing on the user device 12 further enables messaging applications 50, for example Short Message Service ("SMS") messaging applications or applications supporting other messaging protocols, for example via 3G/4G/5G cellular protocols, WiFi™ protocol or TCP/IP through the Internet. A user can implement the messaging applications 50 for example to connect to a message forwarding center, for example via GSM wireless protocol or TCP/IP through the Internet, to communicate with other user devices 12. Social media applications 52, Internet browsers 54, and electronic media players 56 are also enabled by software and/or hardware residing on the user device 12.

The control agent 14 can be configured as a standalone application executable by a processor of the user device 12 in communication with the messaging applications 50, social media applications 52, browsers 54, and electronic media players 56 or other communication facilitating or content providing applications. Alternatively, the control agent 14 can be provided as a processor-implemented add-on application integral with the messaging applications 50, social media applications 52, browsers 54, or other communication facilitating or content providing applications. The control agent 14 is enabled to block applications, electronic communications, and electronic media available to a user of the user device 12 through the messaging applications 50, social media applications 52, browsers 54, electronic media players or other communication facilitating or content providing applications.

The control agent 14 can alternatively be executed on a processor-enabled router 13 such as a wireless router or other networking device that forwards data packets between computer networks. The router 13 is beneficially accessible via wired or wireless communication to the user devices 12 on which a control agent 14 is installed and activeor other user devices 12 on which a control agent 14 is not installed or active. Software and/or hardware residing on the router 13 enables the control agent 14 to monitor and restrict network communications from and to user devices 12 via the router 13. The control agent 14 installed on the router 13 is particularly suited for monitor and control of relatively stationary user devices 12 such as video game consoles, televisions, set-top boxes, and desktop computers The system 10 includes a network-connectable processor-enabled control manager 20 used for controlling use of the user devices 12. The operation of the control manager 20 is described herein with respect to the user devices 12, router 13, and the supervisor device 16. One skilled in the art will recognize that the control manager 20 can operate with other suitable wired or wireless network-connectable computing systems. The control manager 20 includes a classifier engine 22, a classifier datastore 24, a user datastore 26, a supervisor application program interface ("API") 28, a control application program interface ("API") 30, and a telecommunication carrier ("telecom") interface 32.

The control manager 20 can be implemented on one or more network-connectable processor-enabled computing systems, for example in a peer-to-peer configuration, and need not be implemented on a single system at a single location. The control manager 20 is configured for communication via the communications network 8 with other network-connectable computing systems including the user device 12, supervisor device 16, router 13, and a telecommunication carrier system implementing an API ("Telecom API") 80 enabled for controlling communications of the user device 12. Alternatively, the control manager 20 or one or more components thereof can be executed on the user device 12, the router 13, or other system. A supervisor application 40 is provided on the supervisor device 16. The supervisor application 40 can include a downloadable software application specially configured for interface with the supervisor API 28 to communicate control settings to the control manager 20 via the supervisor API 28, the control settings dictating controls implemented by the control manager 20 and the control agent 14. Alternatively, the supervisor application 40 can include a generic web browser or other application allowing a user of the supervisor device 16 to communicate control settings to the control manager 20 via the supervisor API 28.

Referring to FIGS. 2A, 2B, 2C, 2D, and 2E a user interface 42 enabled by the supervisor application 40 on the supervisor device 16 provides interactive displays such as example interactive displays 100, 102, 110, 112, 114 for entering and editing control settings by a supervisory user such as a parent. A first example interactive display 100 and second example interactive display 102 permit such user to identify and name user devices 12, identify whether the user devices 12 are shared or assigned to a particular user, name the child and adult users of the user device 12, and set a location of the user device 12. The first example interactive display 100 identifies an "electronic media player", a "smart television", and a "desktop computer" as "TV1", "TV2", and "PC1" respectively, "Billy", "Kelly", and "Jimmy" as "child users", "Peter" and "Jeanette" as "adult users", and "living room", "playroom", and "study" at "5 Kent St, 08021" as the locations of the listed devices. A second example interactive display 102 identifies a "video game console", "tablet computer", and a "smart phone" as "Game1", "Tablet1", and "Phone1" respectively. The names "Billy", "Kelly", and "Jimmy" are identified as "child users" of Game 1, "Billy" is identified as the exclusive assigned user of "Tablet1", and "Kelly" is identified as the exclusive assigned user of "Phone1". The address "5 Kent St, 08021" and "living room" are identified as the location of "Game1", and "5 Kent St, 08021" is identified as the location of "Tablet1". The "Phone1" is indicated as "mobile (GPS-enabled)" denoting a wireless device. A third example interactive display 110 identifies supervised user birthdate, supervised user gender, use time limit for the supervised user across one or more personal or shared devices, exclusive personal devices and shared devices of the supervised user, and the result that occurs when the supervised user's use time goes over the use time limit. Control settings from the supervisor device 16 are communicated via the control API 30 of the control manager 20 to the control agent 14 on the router 13 or on the user device 12 operated by the supervised user, for example a child of a parent supervisory user operating the supervisor device 16. Control settings can be stored locally on the user device 12 in a control datastore 62 for access by the control agent 14 or on a suitable datastore on the router 13.

A fourth example interactive display 112 and fifth example interactive display 114 may be provided instead of the first and second example interactive displays 100, 102 requiring less detailed user inputs. The fourth and fifth example interactive displays 112, 114 permit a user to identify whether the user devices 12 are shared or assigned to a particular user by entering "family" to indicate a shared user device 12 potentially used by all members of a family or a particular user's name, for example "Billy", to indicate a user to whom the device is specifically assigned. The fourth and fifth example interactive displays 112, 114 further permit a user to indicate a user device 12 is used at a "home", rather than indicating a specific address, or "mobile" for Global Positioning System (GPS) enabled wireless devices.

Referring to FIGS. 3A, 3B, 3C, and 3D the supervisor application 40 via the user interface 42 further enables interactive displays such as example interactive displays 120, 130, 140 for providing alerting and permitting feedback to the control manager 20 by a supervisory user via the supervisor application 40. A sixth example interactive display 120 is generated in response to detection by the control agent 14 of use of a user device 12, and requests the supervisory user "select [from a list of names] the current user(s) of TV1 in the living room." The supervisory user can select listed names via selection areas 122 and confirm selections via an "OK" button 124, which selections are stored in the user datastore 26 and used for classifier training by the classifier engine 22. A seventh example interactive display 130 is generated in response to a determination by the use time engine 34 that a supervised user "Billy" has "exceeded his daily use time limit of 1 HOUR", and therefore that "his TABLET1 screen is locked" on his user device 12. The supervisory user can dismiss the notice via an "OK" button 132 or re-enable Billy's user device 12 via an "Unlock" button 134 sending instructions via the control manager 20 to the control agent 14 on Billy's user device 12 to deactivate the screen lock. An eighth example interactive display 140 is generated in response to a determination by the use time engine 34 that a supervised user "Kelly" has "exceeded her weekly use time limit of 12 HOURS". The supervisory user can dismiss the notice via an "OK" button 142 or disable Kelly's user device 12 via a "Lock Kelly's Phone1" button 144 sending instructions via the control manager 20 to the control agent 14 on Kelly's user device 12 to institute a screen lock or other device restriction. A ninth example interactive display 150 can be provided instead of or in addition to the sixth example interactive display 120. The ninth example interactive display 150 is generated in response to detection by the control agent 14 of use of a user device 12, and asks the supervisory user "Is [user name] using TV1 in the living room." The supervisory user can select a "YES" button 152 or a "NO" button 154, which selection is stored in the user datastore 26 and used for classifier training by the classifier engine 22.

Figure 4B:
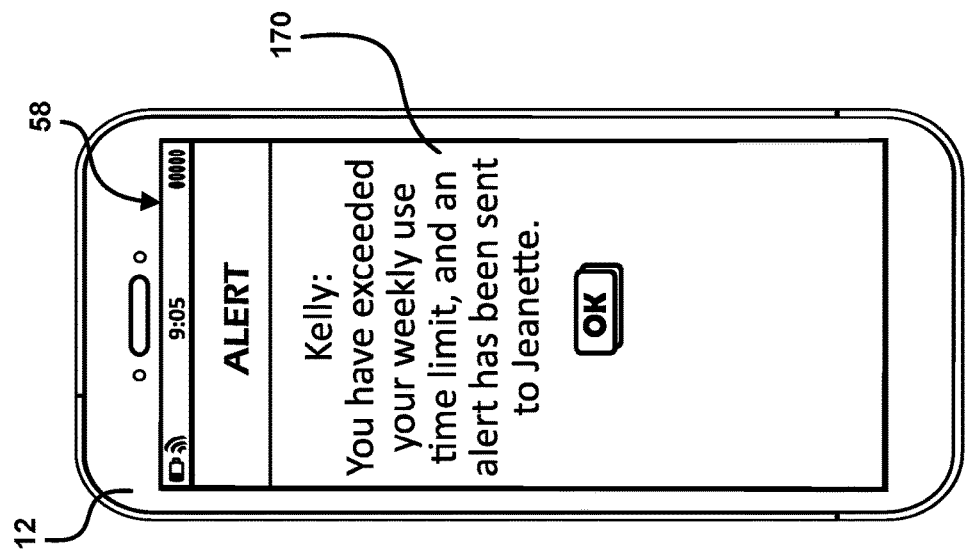
Figure 4A:
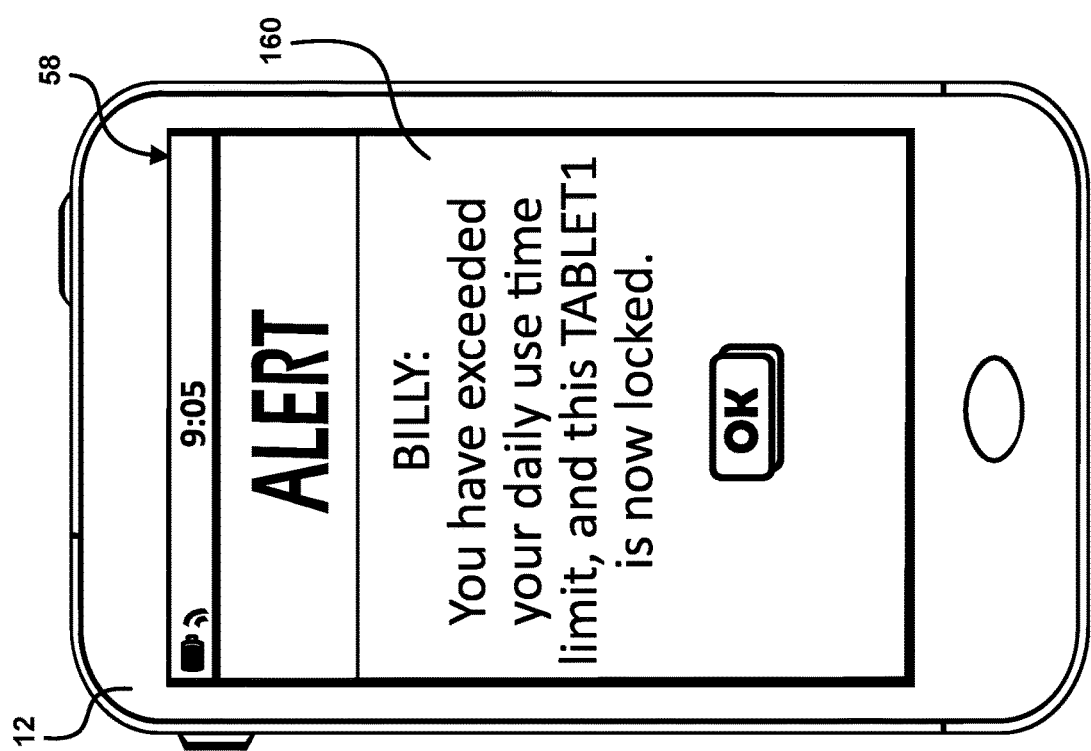

Referring to FIGS. 4A and 4B, the control agent 14 on a user device 12 enables notifications initiated by determinations of the control manager 20 in the form of example interactive displays 160, 170. An eighth example interactive display 160 is generated by the control agent 14 via a user interface 58 on supervised user Billy's user device 12 in response to a determination by the use time engine 34 that Billy has "exceeded [his] daily use time limit". The display 160 indicates as a result that "this TABLET1 is now locked", which locking is performed by the control agent 14 and prevents non-emergency use of the user device 12. A ninth example interactive display 170 is generated by the control agent 14 via a user interface 58 on a supervised user Kelly's user device 12 in response to a determination by the use time engine 34 that Kelly has "exceeded [her] weekly use time limit". The display 170 indicates as a result that "an alert has been sent to [Kelly's mother] Jeanette", and the control agent 14 via the control manager 20 or via a messaging application 50 initiates a communication to Kelly's mother's supervisor device 16 via the supervisor application 40 or a messaging application on the supervisor device 16.

Figure 6:
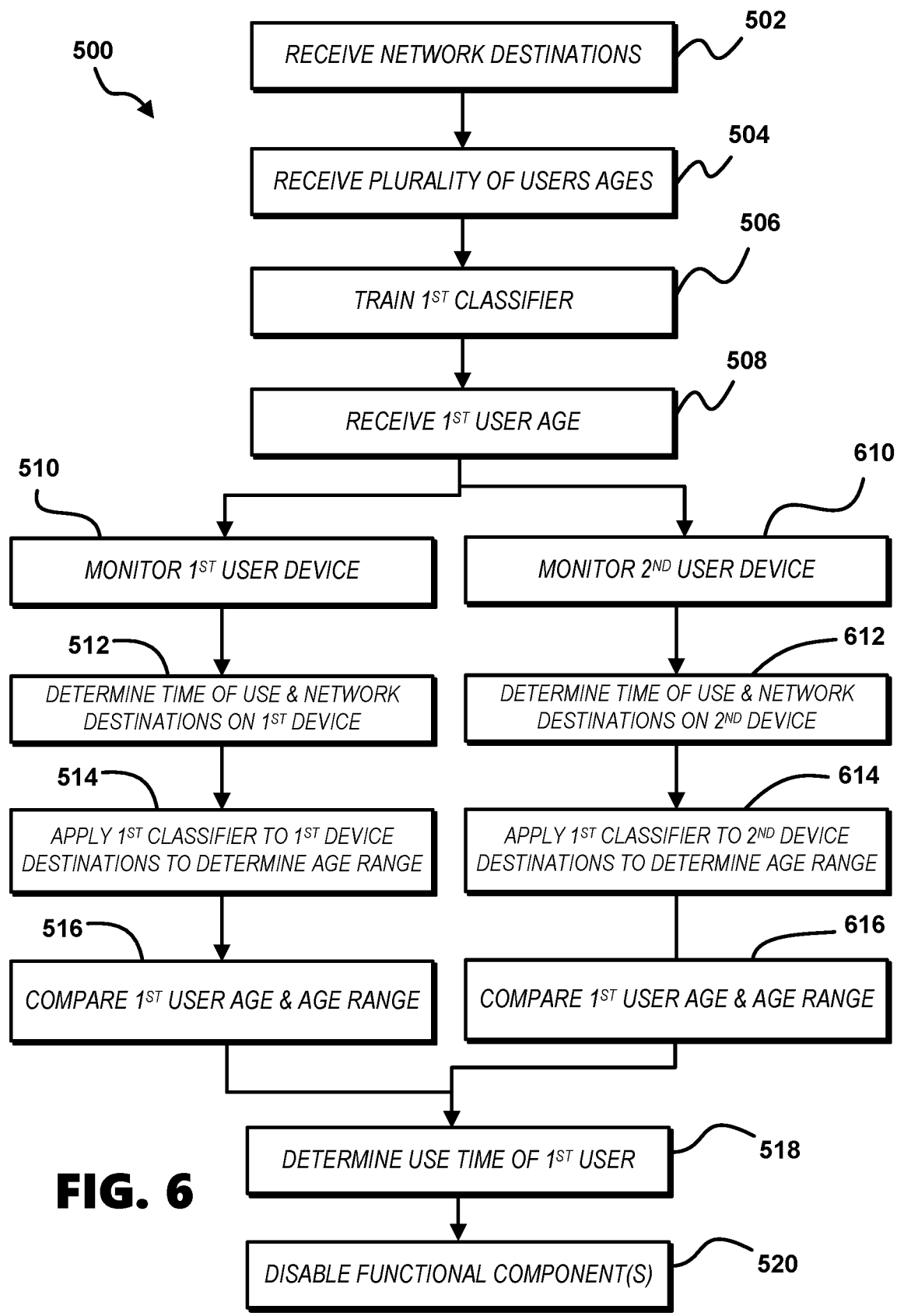

Referring to FIG. 6, a flowchart shows a method 500 of controlling use of network-connectable devices. The method 500 and associated processes are described with reference to the components of the system 10 shown in FIG. 1, including the user device 12, the supervisor device 16, the processor-enabled control manager 20, the control agent 14, and the supervisor application 40. Alternatively, the method 500 can be performed via other suitable systems.

In a step 502, the control manager 20 receives a plurality of network destinations accessed by a plurality of user devices 12 via monitoring enabled by control agents 14 executed on the respective user devices 12. The network destinations can include for example uniform resource locator ("URL") clickstreams or domain name server ("DNS") clickstreams. The control manager 20 further receives ages of users of the plurality of user devices 12 (step 504). The supervisor application 40 enables a user of a supervisor device 16, for example a supervisory user such as a parent, to provide ages of known users of user devices 12 under their supervision via the supervisor API 28, which data is stored in the user datastore 26. The user datastore 26 can further include user gender, user usage rules, and other data corresponding to the user of the user device 12 and provided by the supervisory user via the supervisor application 40.

A first classifier is trained based on the plurality of network destinations and the ages of the users (step 506). The classifier engine 22 beneficially performs the training of a machine learning classifier based on data stored in the user datastore 26 and generates classifier data based on the training which is stored in the classifier datastore 24. The first classifier can include for example linear regression, Naïve Bayes, logistic regression, decision tree, boosted tree, support vector machine, artificial neural network, nearest neighbor, K-means, dimensionality reduction algorithm, or gradient boosting algorithm classifiers or combinations thereof. Training the classifier is beneficially performed by providing the plurality of network destinations as inputs to the classifier, for example ("URL") clickstreams or domain name server ("DNS") clickstreams, and providing the ages of the users or age ranges of the users as outputs of the classifier. Training the classifier can further include inputting data indicating when the network destinations were accessed, for example the week of the year of access, the day of the week of access, and the start and end times of the day of access (i.e., the times of use) during which the network destinations were accessed. Age ranges of outputs can for example include ages 13-18 ("teenager"), ages 9-12 ("pre-teen"), ages 6-8 ("child"), and ages 4-6 ("young child"). The amount of users and accompanying data for training the classifier is not limited and can include millions of users and accompanying user data. An example of such a classifier in the form of a first artificial neural network 200 is described herein with reference to FIG. 5A.

In a step 508, the control manager 20 receives an age of a first user of a particular user group. The supervisor application 40 enables a user having supervisory authority over the particular user group, for example an administrator of a household's telecommunication services plan, to provide the age of the first user and a plurality of other users in the particular user group (e.g., family members of a household) via the supervisor API 28, which data is stored in the user datastore 26. Alternatively, permissions provided by the supervisory user via the supervisor application 40 enable access by the control manager 20 to the user's identifying information by querying the telecom API 80 via the telecom interface 32, which data is stored in the user datastore 26.

In a step 510, a control agent 14, operated via one or more processors on a particular first user device 12, monitors the first user device 12 for network traffic. Alternatively, the first user device 12 can be monitored by a control agent 14 executed on a router 13 or network box including a router 13, or a cloud-based system such as a Domain Name System (DNS) gateway in the network 8, particularly in a case where the first user device 12 does not execute a control agent 14. The first user device 12 is beneficially assigned by a supervisory user to the particular user group via the supervisor application 40. The particular user group can include for example a group of supervised school aged children in a household monitored by a parent supervisory user. The first user device 12 can include for example a shared device accessible by multiple users in the particular user group such as an electronic media player located in a common area of a home. The first user device 12 is beneficially not one of the plurality of user devices 12 from which data is used in training the first classifier, especially if it is a shared device used by multiple users. Beneficially, control agents 14 on multiple user devices 12 assigned to the particular user group, including the first user device 12, or on one or more routers 13 to which multiple user devices 12 are connected, monitor the multiple user devices 12 for network traffic. Network destinations at particular slices of time are received by the control agent 14 via the monitoring, which data is stored in the user datastore 26.

Based on the monitoring, the control agent 14, as executed on the first user device 12 or a router 13 in communication with the first user device 12, determines time of use on the first user device 12 and network destinations accessed by the first user device 12 (step 512). The time of use is beneficially a start time and an end time based on one or more time stamps indicating a slice of time during which the network destinations were accessed.

The trained first classifier is applied to the network destinations accessed by the first user device 12 to determine a first age range corresponding to the user of the first user device 12 (step 514). The classifier can be applied by the control agent 14, or alternatively, by the classifier engine 22 of the control manager 20. The age range can span multiple years for example between age six (6) and eight (8) years (e.g., a child), between nine (9) and twelve (12) years (e.g., a pre-teen), or between thirteen (13) years and eighteen (18) years (e.g., a teenager). Alternatively the age range can span one year or part of one year, for example between nine (9) years and nine (9) years, 11 months. Beneficially, the control agent 14 compares the network destinations accessed by multiple user devices 12 assigned to the particular user group, including the first user device 12, at the particular slices of time with one or more classifiers to determine one or more age ranges corresponding to users in the particular user group (e.g., family members of a household).

In a step 516 the first age range is compared with the age of the first user via the use time engine 34, or alternatively via the control agent 14, and in a step 518, the control manager 20 via the use time engine 34, or alternatively the control agent 14, determines a use time of the first user based on at least the time of use on the first user device 12 and on the comparing of the first age range and the age of the first user. More specifically, the first age range is compared with the received age of the first user, and if the age of the first user is within the first age range, the time of use on the first user device 12 is allocated to the first user increasing the use time of the first user. The use time of the first user can for example equal the duration of the time of use by the first user on the first user device 12 or the sum of one or more durations of the times of use by the first user on the first user device 12 and other user devices 12 assigned to the particular user group. If multiple users of multiple ages are assigned to the particular user group, the determined first age range can be compared with each of the multiple ages to determine use by the first user or other users. The determined use time includes an estimated screen time of the first user, wherein for example determining the use time of a particular user includes incrementing an amount of screen time for the particular user each time the particular user is determined to use one of multiple user devices 12 assigned to a particular user group (e.g., a family), the increment including the time of use on one or more devices including shared devices and devices assigned exclusively to the particular user.

In a step 520, a functional component of the first user device 12 is disabled by the control agent 14 based on the use time of the first user. For example when the use time of the first user exceeds a particular threshold such as one (1) hour during a particular day, the first user device 12 can be disabled by the control agent 14 via a screen lock of the user interface 58 via instructions to the operating system 60, and notification of the disabling can be provided to a user of the user device 12 via the user interface 58. Disabled functional components of a user device 12 can include software or hardware driven features, settings, capabilities and resources. Different user devices 12 may correspond to different functional components. Alternatively, disabling can be performed at a router 13 executing a control agent 14, or a network box including a router 13, or at a cloud-based system such as a DNS gateway to block network traffic to and from a user device 12.

The method 500 can further include receiving genders of the users of the plurality of user devices 12, training the first classifier further based on the genders of the users, receiving a gender of the first user, applying the first classifier further to determine a sex, and comparing the gender of the first user and the determined sex. The determining of the use time is then further based on the comparing the gender of the first user and the determined sex, wherein if the gender of the first user and the determined sex are the same and the age of the first user is within the determined age range, the time of use is allocated to the first user's use time (i.e., screen time). In such manner a known profile (e.g., including age, gender) of the user (e.g., a child) enables the assigning of network destinations (e.g., a DNS or URL clickstream profile) to the user, allowing the user to be identified as using a particular computing device (e.g., a shared computing device).

As indicated above, the time of use on other user devices 12 known or predicted to be used by the first user can also be used in calculating the use time of the first user, such other user devices 12 also assigned to the particular user group. More specifically, the use time of the first user can be calculated as the sum of the times of use on all user devices 12 known or predicted to be operated by the first user. Moreover, functional components of such other user devices 12 known or predicted to be used by the first user can be disabled based on the use time of the first user.

The method 500 accordingly can enable a control agent 14 operated via one or more processors on a second user device 12 to monitor the second user device 12 for network traffic (step 610), the second user device 12 also being assigned to the particular user group. Based on the monitoring, the control agent 14 determines time of use on the second user device 12 and network destinations accessed by the second user device 12 (step 612). The first classifier is applied to the network destinations accessed by the second user device 12 to determine a second age range which for example can be equal to or overlapping with the first age range (step 614). The first classifier can further be applied to data indicating when the network destinations were accessed, for example the week of the year of access, the day of the week of access, and the start and end times of the day of access (i.e., the times of use) during which the network destinations were accessed. The first classifier can be applied by the control agent 14 on the second user device 12, or alternatively, by the classifier engine 22 of the control manager 20. In a step 616 the second age range is compared with the age of the first user via the use time engine 34, or alternatively via the control agent 14, and in the step 518 the control manager 20 via the use time engine 34, or alternatively the control agent 14, can determine the use time of the first user further based on the time of use on the second user device 12 and based on the comparing of the second age range and the age of the first user. For example in response to determining the age of the first user is within the first age range and within the second age range, the use time of the first user is calculated as a sum of the duration of the time of use on the first user device 12 and the duration of the time of use on the second user device 12 and the times of use on any other devices determined to be operated by the first user. In the step 520, a functional component of the second user device 12 can be disabled in addition to or as an alternative to the functional component of the first user device 12 based on the use time of the first user. The disabled user devices 12 beneficially include user devices 12 assigned to the first user (e.g., a smartphone) or one or more user devices 12 in current use by the first user as determined by the control agent 14 (e.g., a shared video game console or television).

The control manager 20 can alternatively receive an explicit indication that the second user device 12 or other user devices 12 are operated exclusively by the first user, for example that the second user device 12 is a smartphone only used by the first user. This information can be received for instance from a supervisory user via the supervisor application 40 which data is stored in the user datastore 26. In such case, a determination of an age range of the user of the user device 12 is not required. The time of use on the second user device 12 can be determined, and the use time of the first user is determined further based on the time of use on the second user device 12 since it is known that the second user device 12 is operated by the first user. For example the use time of the first user can be determined as a sum of the duration of the time of use on the first user device 12 and the duration of the time of use on the second user device 12 and the times of use of any other devices determined to be operated by the first user (e.g., by application of a classifier) or indicated as operated by the first user (e.g., by an indication provided by a supervisory user).

Further, if a particular user device 12 assigned to a particular user group is identified as operated by a particular user, a second classifier can be trained based on network destinations accessed by the particular user device 12. This second classifier can be applied for identifying that the particular user is using other user devices 12, for example shared devices used by multiple users in a household. Such classifier can be used in identifying such multiple users. For instance, a parent can via the supervisor application 40 designate a particular smart phone user device 12 as operated only by a particular child in their household, and the classifier engine 22 can train a classifier with inputs including a URL or DNS clickstream from the particular smart phone user device 12 and outputs including a name or identifier of the particular child, or alternatively the age and gender of the particular child, the classifier including for example an artificial neural network classifier. Data from other children in the household can be used to train the second classifier in the same manner. Alternatively, network destinations including URL or DNS clickstreams from one or more user devices 12 can be assigned respectively to particular users, for example based on a determination made using the first classifier as described above, and a second classifier can be trained based on such network destinations, which second classifier can be used to identify particular users on shared user devices 12.

A device user (e.g., a child) may use different applications, features, and settings on different user devices 12. For example a user's activities on their personal computer may be different from the user's activities on their television or video game console. Also users may use different user devices 12 at different times. For example a tablet computing device may be used in the afternoon for homework, and a television or electronic media player may be used in the evening for entertainment. Such inconsistencies may hinder the building of classifiers for predicting users of shared user devices 12. Device location can facilitate the process of training and applying classifiers to predict users of shared user devices 12.

The control manager 20 is configured to receive the ages of multiple users in a particular user group. The step 508 above can accordingly further include receiving the age of a second user. The supervisor application 40 enables a user having supervisory authority over the particular user group, for example an administrator of a telecommunication services plan, to provide the age of the multiple users through the supervisor application 40 via the supervisor API 28, which data is stored in the user datastore 26. As indicated above, the control agent 14, operated via one or more processors on the second user device 12, monitors the second user device 12 for network traffic in step 610, the second user device 12 also assigned to the particular user group. Further as indicated above, based on the monitoring, the control agent 14 determines time of use on the second user device 12 and network destinations accessed by the second user device 12 (step 612), and the first classifier is applied to the network destinations accessed by the second user device 12 to determine a second age range (step 614). The first classifier can further be applied to data indicating when the network destinations were accessed, for example the week of the year of access, the day of the week of access, the start time of the day of access, and the time of use during which the network destinations were accessed. The step 616 can further include comparing the second age range with the age of the second user via the use time engine 34, or alternatively via the control agent 14. The step 518 can further include determining by the control manager 20 via the use time engine 34, or alternatively via the control agent 14, the use time of the second user based on the time of use on the second user device 12 and based on the comparing of the second age range and the age of the second user, the age of the second user being within the second age range. The use time of the second user can for example equal the duration of the time of use by the second user on the second user device 12 or the sum of one or more durations of the times of use by the second user on the second user device 12 and other user devices 12 assigned to the particular user group. The determined use time includes an estimated screen time of the second user, wherein for example determining the use time of a particular user includes incrementing an amount of screen time for the particular user each time the particular user is determined to use one of multiple user devices 12 assigned to a particular user group (e.g., a family), the increment including the time of use on one or more devices including shared devices and devices assigned exclusively to the particular user. The step 520 can further include the control agent 14 disabling a functional component of the second user device 12 based at least on the use time of the second user.

The second user device 12 may be a shared device used by one or more other users in addition to the second user. As such, based on the monitoring, the control agent 14 can determine an additional time of use on the second user device 12 and additional network destinations accessed by the second user device 12. The first classifier can be applied to the additional network destinations accessed by the second user device 12 to determine a third age range which for example can be equal to or overlapping with the first age range. The first classifier can further be applied to data indicating when the additional network destinations were accessed, for example the week of the year of access, the day of the week of access, the start time of the day of access, and the time of use during which the network destinations were accessed. The third age range is compared with the age of the first user and other users in the particular user group via the use time engine 34 or alternatively the control agent 14, and the control manager 20 via the use time engine 34, or alternatively via the control agent 14, can determine the use time of the first user further based on the additional time of use on the second user device 12 and based on the comparing of the third age range and the age of the first user. For example the use time of the first user is determined as a sum of the duration of the time of use by the first user on the first user device 12 and the additional duration of the time of use by the first user on the second user device 12 and the times of use by the first user on any other user devices 12 assigned to the particular user group and determined to be operated by the first user or indicated as operated by the first user.

Alternatively, in the case of shared devices, for example digital media players connected to displays located in common areas of a household, it is conceivable that multiple users may be consuming digital media on a particular user device 12 simultaneously, in which case the use time of multiple users can be increased based on the time of use determined on a particular shared user device 12. For example, taking the case where first classifier of the method 500 is applied to the network destinations accessed by a second user device 12 which is a shared device to determine a second age range, and the control manager 20, or alternatively the control agent 14, determines a use time of a second user based at least on the time of use on the second user device 12 and on a comparing of the second age range and the age of the second user, the age of the second user being within the second age range, and the first age range determined in step 516 being equal to or overlapping with the second age range, the control manager 20, or alternatively the control agent 14 can determine the use time of the first user and the second user further based on the time of use on the second user device 12 and the second age range. For instance, if the age of the first and second users are within the first age range and the second age range, the use time of the first user can include a first portion of the determined time of use on the second user device 12, and the use time of the second user can include a second portion of the determined time of use on the second user device 12. The portioning can be determined based for example on the ages of both the first and second users or divided equally between the first and second users. This can be useful for example in allocating time of use to users of a particular type of media which can only be used by one user at a time, for example a single player game application, on a shared user device 12. When two or more users in a particular user group are close in age making confident identification impossible, probabilistically portioning time between the users as described is beneficial.

Alternatively, if the age of the first user is within the first age range and the second age range, the use time of the first user can be determined further based on the time of use on the second user device 12 and the second age range, wherein the use time of the first user includes the time of use on the second user device 12 and wherein the use time of the second user also includes the time of use on the second user device 12, without portioning the time between the two users. Probabilistically assigning time of use to multiple users in such manner is useful for example in allocating time of use to users of a particular type of media which can be used by multiple users simultaneously, for example a movie or other video played by an electronic media player 56.

Further, a request can be transmitted by the control manager 20 to another user such as a parent of the first user, for example via the supervisor application 40 of the supervisor device 16, to identify the user or confirm the user of the first user device 12 is the first user. The request can include statements such as "Is the current user of the living room computer Jim?" or "select the appropriate current user of the living room computer: Jim, Sally, or Bill". See for example interactive displays 120, 150 in FIGS. 3A and 3D respectively. Confirmation by such other user can be used to trigger the adding of the time of use of the first user device 12 to the use time of the first user or can be used to increase the confidence that the time of use on the first user device 12 should be added to the use time of the first user. Such information is further beneficially used for classifier training.

Tracking a user's location on a mobile user device 12 known to be assigned to the user is useful in determining whether particular shared user devices 12 are operated by such user. Location information from the mobile user device 12 enables a determination for instance of whether a user is home in proximity to shared user devices 12 or away from home. For example when location shows that a child is away from home, any DNS or URL clickstream originating from a shared user device 12 within the home is not to belong to that child. The control manager 20 can assign the child's profile (e.g., including child age and gender) to the clickstream when location indicates the child is in the home or alternatively no location information conclusively indicates the child is outside of the home. Location information therefore allows more reliable matching of network destinations (e.g., clickstreams) on a shared user device 12 to users by eliminating users whose location is too distanced from the shared user device 12, and matching to the network destinations, or increasing the probability of a match, those users whose location indicates close proximity to the shared user device 12.

The control manager 20 can receive an indication of the location of a shared user device 12. The location of a mobile user device 12 assigned to a particular user can be monitored, for example via the LDS 64 which can include a GPS receiver. The control manager 20 via the use time engine 34, or alternatively via the control agent 14, can allocate the time of use on the shared user device 12 to the use time of the particular user based on the location of the shared user device 12 relative to the location of the mobile user device 12, and beneficially further based on the age range determined by the classifier engine 22, and the age of the particular user. The allocation of the time of use on the shared user device 12 is performed by determining a distance between the location of the shared user device 12 and the location of the mobile user device 12. Beneficially, the time of use on the shared user device 12 is applied to the particular user's use time responsive to the distance between the location of the first user device and the location of the mobile device being less than a particular threshold distance.

Figure 7:
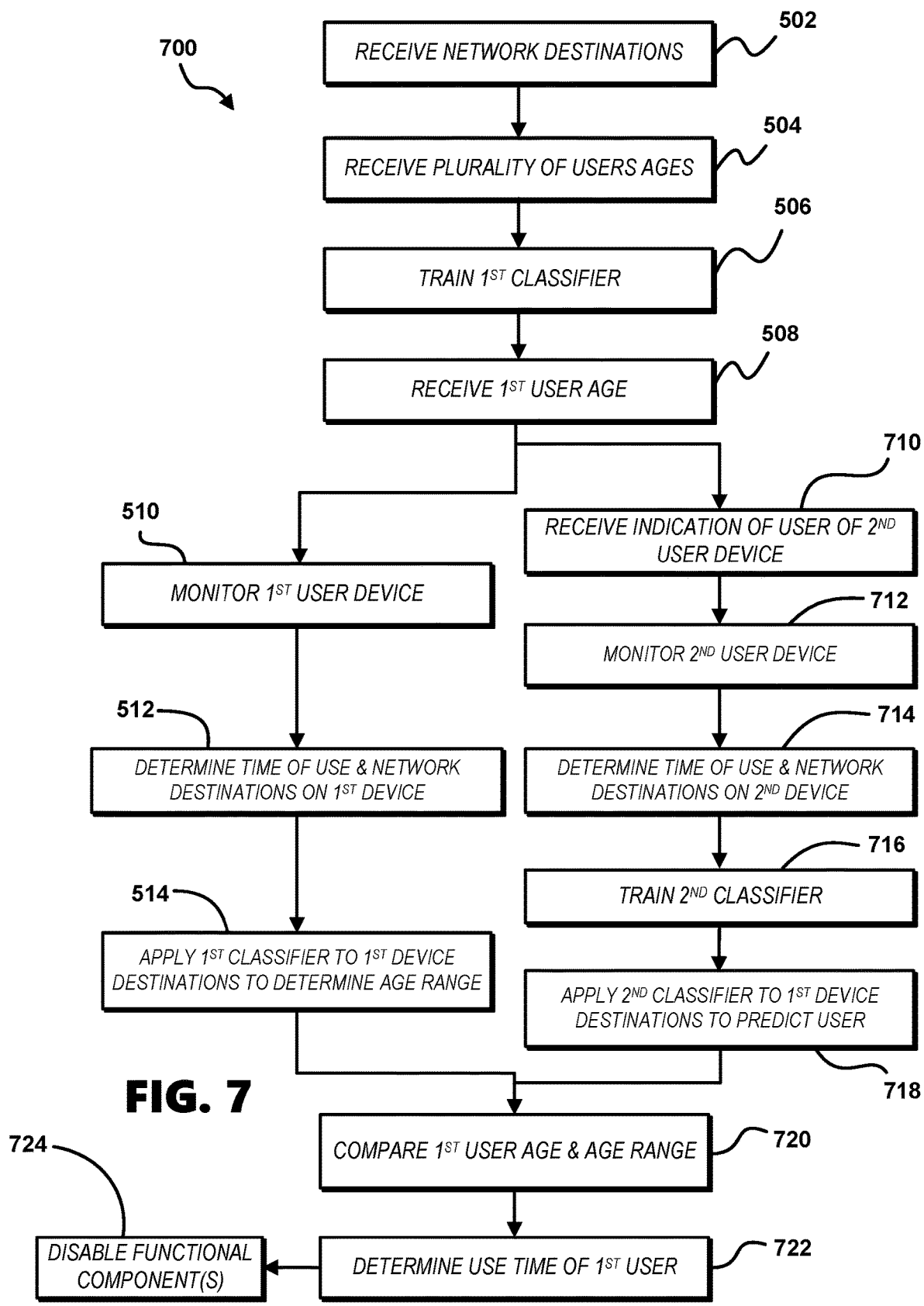

Referring to FIG. 7, a flowchart shows a method 700 of controlling use of network-connectable devices. The method 700 includes process steps of the method 500 as described herein as well as additional steps. While the method 700 and associated processes are described with reference to the components of the system 10 shown in FIG. 1, the method 700 may alternatively be performed via other suitable systems. In a step 710, the control manager 20 receives an indication that a second user device 12 is operated by or assigned to the first user, for example an indication received from a supervisory user via the supervisor application 40. Alternatively, the control manager 20 can apply the first classifier to network destinations of the second user device 12 to determine the second user device 12 is operated by the first user based on an age and/or gender output by the first classifier and a known age and/or gender of the first user. A control agent 14 on the second user device 12 monitors the second user device 12 for network traffic (step 712) and determines time of use by the user on the second user device 12 and network destinations accessed by the second user device 12 (step 714).

A second classifier is trained based at least on the network destinations accessed by the second user device 12 (step 716), which second classifier is applied to the network destinations accessed by the first user device 12 to predict use by the first user of the first user device 12 (step 718). In a step 720 the first age range determined in step 514 is compared with the age of the first user via the use time engine 34, or alternatively via the control agent 14. In a step 722, the control manager 20 via the use time engine 34, or alternatively via the control agent 14, determines a use time of the first user based on at least the time of use on the first user device 12, and on the comparing of the first age range and the age of the first user, and further based on the predicted use by the first user on the first user device 12 predicted by the second classifier. For example, if the age of the first user is within the first age range and if the second classifier predicts use by the first user on the first user device 12, the time of use on the first user device 12 can be allocated to the first user. The prediction of device use by the first user with the second classifier supplements the determination that the age of the first user is within the first age range to increase the confidence of the determination of the use time of the first user, particularly the incrementing of screen time of the first user. This is especially useful in cases where there are multiple users in a particular user group who are close in age, for example multiple young children in a particular household. The second classifier or additional classifiers can be trained based on network destinations accessed by additional user devices 12 known to be operated by the first user, which classifier or classifiers can be applied to the network destinations of user devices 12 of unknown users (e.g., shared devices) to predict if the first user is using such user devices 12 of unknown users. In a step 724, one or more functional components of the first user device 12 are disabled by the control agent 14 based on the determined use time of the first user.

Figure 8:
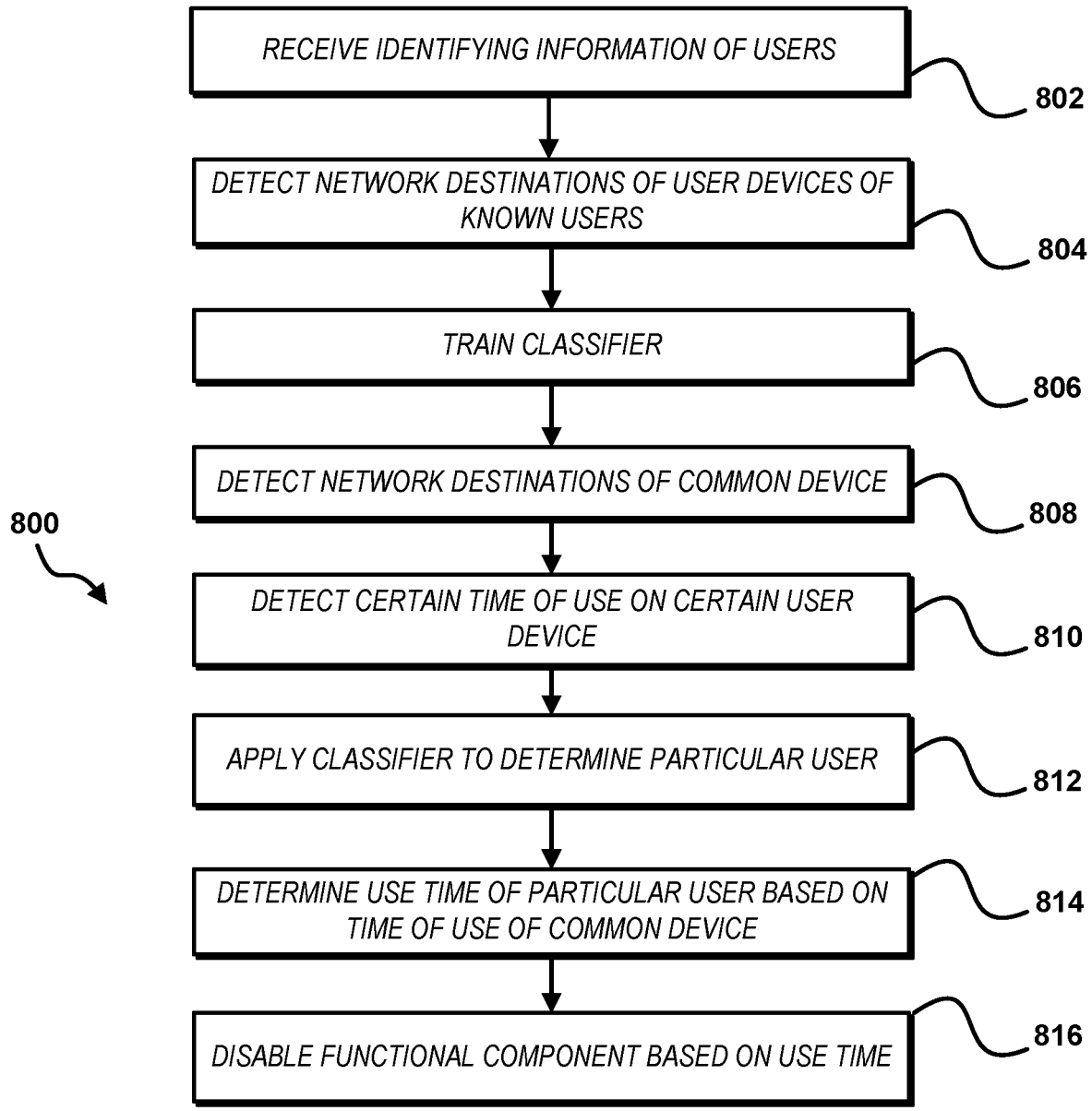

Referring to FIG. 8, a flowchart shows a method 800 of controlling use of network-connectable devices. While the method 800 and associated processes are described with reference to the components of the system 10 shown in FIG. 1, including the user device 12, the supervisor device 16, the processor-enabled control manager 20, the control agent 14, and the supervisor application 40, the method 800 may alternatively be performed via other suitable systems.

In a step 802, the control manager 20 receives identifying information of a plurality of users of a plurality of user devices 12. Identifying information beneficially includes at least a name of each user and one or more user devices 12 assigned to each user. In a step 804, a control agent 14 detects on each of the plurality of user devices 12 of the plurality of users a plurality of network destinations accessed by the plurality of user devices 12 and a plurality of times of use of the plurality of user devices 12. The control agent 14 can be executed by respective processors of the user devices 12 or one or more routers 13 in network communication with the user devices 12. The control manager 20 receives the plurality of network destinations and the plurality of times of use from the user devices 12. The plurality of users are beneficially members of a particular user group, such as family members in a household, operating a discrete number of user devices 12.

One or more classifiers are trained at least based on the plurality of network destinations of the plurality of user devices 12, the plurality of times of use of the plurality of user devices 12, and the identifying information of the plurality of users of the plurality of user devices 12 (step 806). A time of use includes a start time and an end time based on one or more time stamps indicating a slice of time during which the network destinations were accessed. The classifier engine 22 beneficially performs the training based on data stored in the user datastore 26 and generates classifier data based on the training which is stored in the classifier datastore 24. Further, the control agent 14 can detect and the control manager 20 can receive locations of the plurality of user devices 12 at respective times of use of the plurality of user devices 12, and the classifier engine 22 can perform the training further based on the locations of the plurality of user devices 12. In training the one or more classifiers, the plurality of network destinations and the plurality of times of use can be provided as inputs to the one or more classifiers and the identifying information of the plurality of users of the plurality of user devices as outputs of the one or more classifiers. Training the one or more classifiers can further include inputting other data indicating when the plurality of network destinations were accessed, for example the weeks of the year of access and the days of the week of access corresponding to the plurality of times of use during which the network destinations were accessed. An example of such a classifier in the form of a third artificial neural network 400 is described herein with reference to FIG. 5C.

In a step 808, a control agent 14 detects on a shared user device 12 one or more particular times of use on the shared user device 12 and one or more particular network destinations of the one or more particular times of use. The network destinations can include for example uniform resource locator ("URL") clickstreams or domain name server ("DNS") clickstreams. A control agent 14 detects on a certain user device 12 of the plurality of user devices 12 a certain time of use on the certain user device 12 (step 810). The time of use is beneficially includes a start time and an end time based on one or more time stamps indicating a slice of time during which the network destinations were accessed. The control manager 20 receives from the shared user device 12 the one or more particular times of use and the one or more particular network destinations and receives from the certain user device 12 the certain time of use.

The one or more classifiers are applied to compare at least the one or more particular times of use, the one or more particular network destinations, an identification of the certain user device 12, and the certain time of use on the certain user device 12 to determine an identity of a particular user of the plurality of users using the shared user device 12 at the one or more particular times of use (step 812). The one or more classifiers can further be applied to other data indicating when the network destinations were accessed, for example the week of the year of access and the day of the week of access during which the network destinations were accessed. The classifier can be applied by the control agent 14, or alternatively, by the classifier engine 22 of the control manager 20. Alternatively, the one or more classifiers can be applied to compare just the particular time of use on the shared user device 12 and the certain time of use on the certain user device 12 to determine the identity of the particular user on the shared user device 12. For example if a particular user is using a certain mobile user device 12 at a certain time the one or more classifiers may determine that user is or is not using a certain shared user device 12 at the certain time. The method 800 enables a less resource-intensive machine learning approach to determining a user of a particular shared user device 12, as prediction of user age is not required, and the one or more classifiers are trained based on data from a particular group of users beneficially of limited size, such as a group of members of a particular household.

The control manager 20 can further receive an indication of a location of the shared user device 12, for example from a supervisory user via the supervisor application 40, and location data of the certain user device 12, for example from the control agent 14 which accesses location data from a location determining system ("LDS") 64 such as a global positioning system ("GPS"). The particular user of the shared user device 12 can be determined by the one or more classifiers further based on a distance between the location of the certain user device 12 and the location of the shared user device 12. For example, if the location of the certain user device 12 is distanced sufficiently away from the shared user device 12, it may be determined by the one or more classifiers that a current user of the shared user device 12 is not the current known user of the certain user device 12.

The one or more classifiers of the method 800 beneficially include at least a first classifier and a second classifier. The classifier engine 22 beneficially trains the first classifier based on the plurality of network destinations of the plurality of user devices 12 and the identifying information of the plurality of users of the plurality of user devices 12. The plurality of user devices 12 are beneficially members of a particular user group such as children and adults in a particular household, each user operating one or more user device 12. The network destinations beneficially include a DNS or URL clickstream from each user device 12. The classifier engine 22 further groups the plurality of times of use into groups of times of use based on time proximity of the plurality of times of use and trains a second classifier based on the groups of times of use and the identifying information of the plurality of users of the plurality of user devices 12. Grouping the times of use beneficially includes collecting a list of user devices 12 of known users, for example including smartphones assigned to particular children in a household, the user devices 12 beneficially having been actively recently used, for example used within the last one hour. The first classifier is applied at least to the one or more particular network destinations, and the second classifier is applied at least to the one or more particular times of use, the identification of the certain user device 12, and the certain time of use of the certain user device 12 to determine the identity of the particular user of the plurality of users. The time of use beneficially includes a start time and an end time based on one or more time stamps indicating a slice of time during which the network destinations were accessed. The second classifier can further be applied to other data indicating when the particular network destinations were accessed, for example the week of the year of access and the day of the week of access corresponding to the certain time of use during which the network destinations were accessed. The first and second classifiers can be ensemble combined and applied as a combined classifier.

More than one time of use from more than one certain user device 12 of the method 800 can be received by the control manager 20. The control manager 20 can receive from a plurality of certain user devices 12 of the plurality of user devices 12 a plurality of certain times of use of the plurality of certain user devices 12, the plurality of certain user devices 12 including the certain user device 12 indicated in step 810. In step 812, the one or more classifiers can further be applied to identifications of the plurality of certain devices and the plurality of certain times of use of the plurality of certain devices to determine the identity of the particular user of the plurality of users using the shared user device 12 at the particular time of use. Beneficially, the one or more classifiers applied in step 812 are applied to identifications and times of use of certain user devices 12 actively used within a particular time period (e.g., one hour) of an occurrence of a stream of the network destinations from the shared user device 12 at the particular time of use, for example a URL or DNS clickstream. In such manner, data showing the near-in-time use of certain user devices 12 of known users can be used to predict the user of the shared user device 12.

In a step 814, the control manager 20 via the use time engine 34, or alternatively the control agent 14, determines a use time of the particular user at least based on the particular time of use detected on the shared device 12. The determined use time includes an estimated screen time of the particular user, wherein for example determining the use time of a particular user includes incrementing an amount of screen time for the particular user each time the particular user is determined to use one of multiple user devices 12 assigned to a particular user group (e.g., a household), the increment including the time of use on one or more devices including shared user devices 12 and user devices 12 assigned exclusively to the particular user.

In a step 816, a functional component of a particular user device 12 of the plurality of user devices 12 is disabled based at least on the use time of the particular user, the particular user device 12 identified as operated by the particular user. For example when the use time of the first user exceeds a particular threshold such as one (1) hour during a particular day, the particular user device 12 can be disabled by the control agent 14 via a screen lock. Disabled functional components of a user device 12 can include software or hardware driven features, settings, capabilities and resources. Different user devices 12 may correspond to different functional components.

Methods described herein address the problem of managing use time of a plurality of users on a plurality of user devices 12, where one or more of the plurality of user devices 12 may be used by more than one of the plurality of users. Moreover, methods described herein permit enforcing rules on a particular user, such as the disabling of user features and settings, on particular user devices 12 accessible to the particular user.

As indicated above, location information from a mobile user device 12 assigned to a particular user group enables a determination of whether a user is in proximity to shared user devices 12 assigned to the particular user group. For example, when location determined by a mobile user device 12 shows that a particular user is located away from a particular shared user device 12, any DNS or URL clickstream originating from the shared user device 12 can be determined not to belong to the particular user. The control manager 20 can assign a user's profile (e.g., age and gender) to the clickstream when location indicates the user is within a threshold distance from the shared user device 12 or no location information conclusively indicates that the user is outside of the threshold distance.

Figure 9:
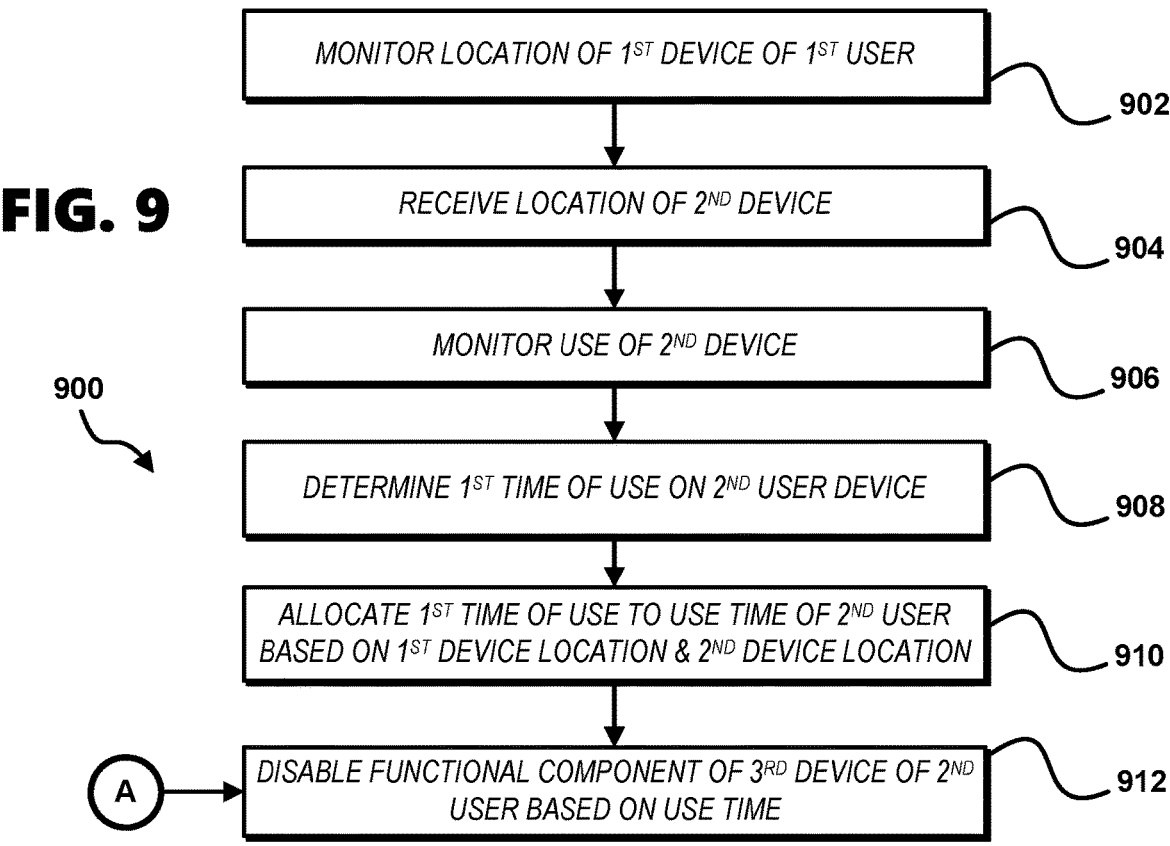

Referring to FIG. 9, a flowchart shows a method 900 of controlling use of network-connectable computing devices. While the method 900 and associated processes are described with reference to the components of the system 10 shown in FIG. 1, including the user device 12, the supervisor device 16, the processor-enabled control manager 20, the control agent 14, and the supervisor application 40, the method 900 may alternatively be performed via other suitable systems.

In a step 902, location of a first user device 12 of a first user is monitored. The first user device 12 is a wireless mobile computing device such as a smartphone assigned to the first user and is beneficially monitored via the control agent 14 and supervisor application 40. The first user is beneficially a member of a particular group of users, such as members of a household. In a step 904, an indication of a location of a second user device 12 is received by the control manager 20 via the supervisor application 40. The second user device 12 is for example a shared user device 12 assigned to the particular group of users, such assignment beneficially performed during an initialization procedure enabled by the supervisor application 40. Use of the second user device 12 is monitored for example via a control agent 14 executed on the second user device 12 or executed on an router 13 in networked communication with the second user device 12 (step 906). A first time of use on the second user device 12 is determined based on the monitoring (step 908). The first time of use includes one or more time stamps relating a length of time and time of day (i.e., a slice of time) in which particular network destinations were accessed, for example including a DNS or URL clickstream.

In a step 910, the first time of use on the second user device 12 is allocated to a use time of a second user, who is a member of the particular user group, based on the location of the first user device 12 relative to the location of the second user device 12. The determined use time includes an estimated screen time of the second user, wherein allocating a time of use includes incrementing the screen time by the time of use. Particularly, the first time of use is allocated to the use time of the second user if by a comparing of the locations of the first and second user devices 12 the distance of the first user device 12 from the second user device 12 at the first time of use exceeds a particular threshold. For example if the location of the first user device 12 is more than 200 meters from the location of the second user device 12, it can be predicted that the first user is not using the second user device 12 so the user must be the second user or some other user in the particular user group. Accordingly, the time of use is allocated to the second user's use time. In a step 912, a functional component of a third user device 12 assigned to the second user is disabled via a control agent 14 based at least on the use time of the second user 12. The third user device 12 can include for example a mobile computing device such as a smartphone assigned exclusively to the second user and beneficially monitored and disabled via the control agent 14. Alternatively or in addition to disabling the third user device 12, the second user device 12 can also have a functional component disabled via a control agent 14 on the second user device 12 during a time when the second user is predicted to be using the second user device 12 (e.g., the second time of use).

Figure 10:
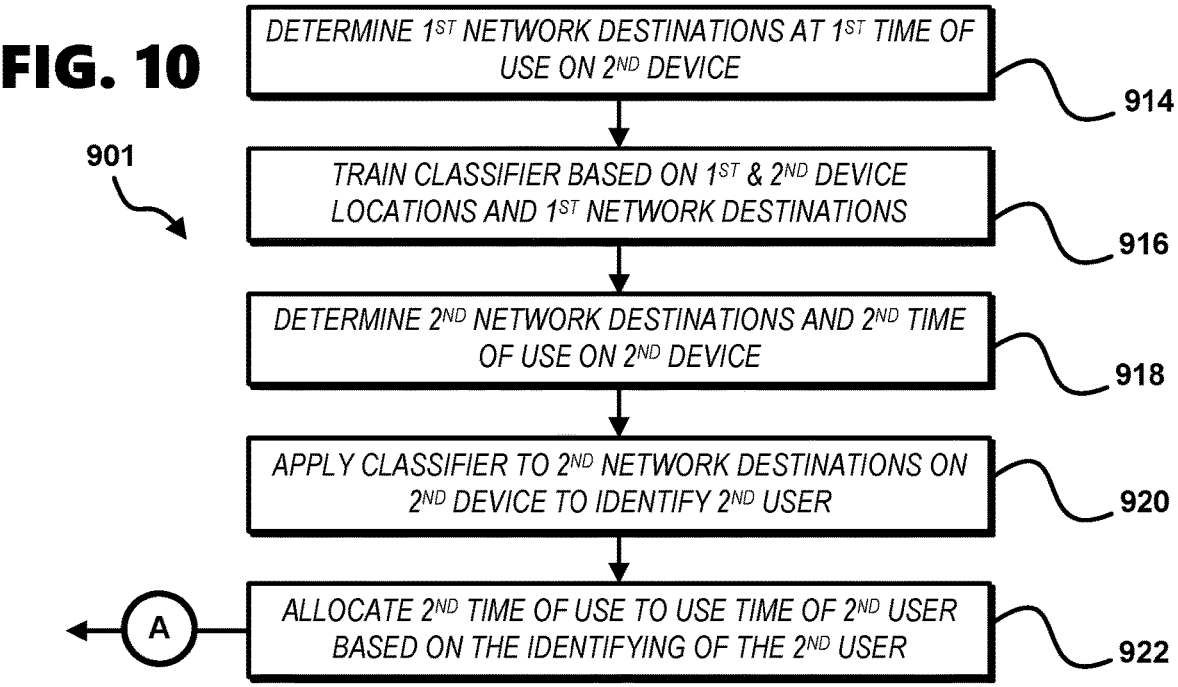

Referring to FIG. 10, a flowchart shows a continuation 901 of the method 900 including additional process steps for controlling use of networked computing devices. In a step 914, first network destinations at the first time of use on the second user device 12 are determined. The first network destinations can include for example a DNS or URL clickstream originating from the second user device 12. A classifier for identifying the second user is trained based on the location of the first user device 12 relative to the location of the second user device 12 and based on the first network destinations on the second user device 12 (step 916). Beneficially, the classifier is trained by first identifying the second user based on a distance of the location of the first user device 12 from the second user device 12 exceeding a particular threshold. For example if the location of the first user device 12 is more than 200 meters from the location of the second user device 12, it can be predicted that the first user is not using the second user device 12, so the network destinations (e.g., a DNS or URL clickstream) can be used in training a classifier to identify the second user. Then at a later time, second network destinations and a second time of use on the second user device 12 are determined based on the monitoring (step 918), and the trained classifier is applied to the second network destinations on the second user device 12, or alternatively another shared user device 12, to identify the second user (step 920). The second time of use on the second user device 12 is allocated to the use time of the second user based on the identifying of the second user by the classifier (step 922), which use time can be used in the triggering the disabling of the functional component of the third user device 12 (step 912) via step "A", or the disabling of other user devices 12 used by the second user.

Referring to FIG. 5A, an exemplary classifier in the form of a first artificial neural network 200 is shown useful for performing herein-described methods. Alternatively, other classifier types can be implemented such as linear regression, Naïve Bayes, logistic regression, decision tree, boosted tree, support vector machine, artificial neural network, nearest neighbor, K-means, dimensionality reduction algorithm, or gradient boosting algorithm classifiers. The first artificial neural network includes an input layer 202, hidden layer 220, and output layer 222. The input layer 202 includes network destinations 204 accessed by a user on a user device 12 during a time period or "time of use" defined by one or more time stamps indicating a week of the year 206, day of the week 208, start time of the day 210, and end time of the day 212 corresponding to when the network destinations 204 were detected by a control agent 14. The network destinations 204 can be excerpted for example from URL or DNS clickstreams detected by a control agent 14 on a user device 12 or router 13. Four network destinations 204 are shown, however any suitable number of network destinations can be input.

The output layer 222 includes age ranges 224, 226, 228, 230, 232 of users which can be populated during classifier training based on data received from a supervisory user via the supervisor application 40 for example data which is input via example interactive displays 100, 102, 110, 112, 114 of FIGS. 2A, 2B, 2C, 2D, and 2E. Hidden layers of nodes 220 are shown for convenience of illustration as two five node rows. Alternatively, other suitable number and arrangement of hidden nodes can be implemented. In training the first artificial neural network 200 the network destinations 204, week of the year 206, day of the week 208, start time of the day 210, and end time of day 212 are provided as the input layer 202, the corresponding age ranges 224, 226, 228, 230, 232 are provided as the output layer 222, and backpropagation is beneficially employed. Alternatively, other machine learning protocols may be implemented for training the first artificial neural network 200.

Referring to FIG. 5B, an exemplary classifier in the form of a second artificial neural network 300 is shown useful for performing herein-described methods. The second artificial neural network 300 includes an input layer 302, hidden layer 320, and output layer 322. Like the input layer 202 of the first artificial neural network 200, the input layer 302 includes network destinations 204 accessed by a user on a user device 12 during a time period (i.e., "time of use") defined by one or more time stamps indicating a week of the year 206, day of the week 208, start time of the day 210, and end time of the day 212 corresponding to when the network destinations 204 were detected by the control agent 14. The output layer 322 includes combination age range/gender indicators 324, 326, 328, 330, 332, 334, 336, 338 and an age range 340 of users which can be populated during classifier training based on data received from a supervisory user via the supervisor application 40 for example data which is input via example interactive displays 100, 102, 110, 112, 114 of FIGS. 2A, 2B, 2C, 2D, and 2E. The second artificial neural network 300 enables a more detailed identification of users, by age range and gender, than the first artificial neural network 200 which outputs only age ranges. Hidden layers of nodes 320 are shown for convenience of illustration as two five node rows. Alternatively, other suitable number and arrangement of hidden nodes can be implemented. In training the second artificial neural network 300 the network destinations 204, week of the year 206, day of the week 208, start time of the day 210, and end time of the day 212 are provided as the input layer 302, the corresponding range/gender indicators 324, 326, 328, 330, 332, 334, 336, 338 and the age range 340 are provided as the output layer 322, and backpropagation is beneficially employed. Alternatively, other machine learning protocols may be implemented for training the second artificial neural network 300.

Referring to FIG. 5C, an exemplary classifier in the form of a third artificial neural network 400 is shown useful for performing herein-described methods. The third artificial neural network 400 includes an input layer 402, hidden layer 420, and output layer 422. Like the input layer 202 of the first artificial neural network 200, the input layer 402 includes network destinations 204 accessed by a user on a user device 12 during a time period or (i.e., "time of use") defined by one or more time stamps indicating a week of the year 206, day of the week 208, start time of the day 210, and end time of the day 212 corresponding to when the network destinations 204 were detected by the control agent 14. The output layer 422 includes a list of specifically identified (i.e., by name) child users 424 and specifically identified adult users 426 which can be populated during classifier training based on data received from a supervisory user via the supervisor application 40 for example data which is input via example interactive displays 100, 102, 110, 112, 114 of FIGS. 2A, 2B, 2C, 2D, and 2E. The third artificial neural network 400 enables a more detailed identification of users, by actual name, than the first artificial neural network 200 which outputs only age ranges or the second artificial neural network 300 which outputs age range and gender. Hidden layers of nodes 420 are shown for convenience of illustration as two five node rows. Alternatively, other suitable number and arrangement of hidden nodes can be implemented. In training the third artificial neural network 400, the network destinations 204, week of the year 206, day of the week 208, start time of the day 210, and end time of the day 212 are provided as the input layer 402, the corresponding child users 424 and adult users 426 are provided as the output layer 422, and backpropagation is beneficially employed. Alternatively, other machine learning protocols may be implemented for training the third artificial neural network 400.

FIG. 11 illustrates in abstract the function of an exemplary computer system 1000 on which the systems, methods and processes described herein can execute. For example, the user device 12, router 13, supervisor device 16, control manager 20, and telecom API 80 can each be embodied by a particular computer system 1000. The computer system 1000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 1024 executable by the computer system 1000.

The computer system 1000 can operate as a standalone device or can be connected (e.g., networked) to other machines. In a networked deployment, the computer system 1000 may operate in the capacity of a server or a client machine in server-client network environment, or as a peer machine in a peer-to-peer (or distributed) network environment. The computer system 1000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 1000 includes a processor 1002, for example a central processing unit (CPU) or a graphics processing unit (GPU), a main memory 1004, and a static memory 1006 in communication via a bus 1008. A visual display 1010 for example a liquid crystal display (LCD), light emitting diode (LED) display or a cathode ray tube (CRT) is provided for displaying data to a user of the system 1000. The visual display 1010 can be enabled to receive data input from a user for example via a resistive or capacitive touch screen. A character input apparatus 1012 can be provided for example in the form of a physical keyboard, or alternatively, a program module which enables a user-interactive simulated keyboard on the visual display 1010 and actuatable for example using a resistive or capacitive touchscreen. An audio input apparatus 1013, for example a microphone, enables audible language input which can be converted to textual input by the processor 1002 via the instructions 1024. A pointing/selecting apparatus 1014 can be provided, for example in the form of a computer mouse or enabled via a resistive or capacitive touch screen in the visual display 1010. A data drive 1016, a signal generator 1018 such as an audio speaker, and a network interface 1020 can also be provided. A location determining system 1017 is also provided which can include for example a GPS receiver and supporting hardware.

The instructions 1024 and data structures embodying or used by the herein-described systems, methods, and processes, for example software instructions, are stored on a computer-readable medium 1022 and are accessible via the data drive 1016. Further, the instructions 1024 can completely or partially reside for a particular time period in the main memory 1004 or within the processor 1002 when the instructions 1024 are executed. The main memory 1004 and the processor 1002 are also as such considered computer-readable media.

While the computer-readable medium 1022 is shown as a single medium, the computer-readable medium 1022 can be considered to include a single medium or multiple media, for example in a centralized or distributed database, or associated caches and servers, that store the instructions 1024. The computer-readable medium 1022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 1024 can be transmitted or received over a communications network, for example the communications network 8, using a signal transmission medium via the network interface 1020 operating under one or more known transfer protocols, for example FTP, HTTP, or HTTPs. Examples of communication networks include a local area network (LAN), a wide area network (WAN), the Internet, mobile telephone networks, Plain Old Telephone (POTS) networks, and wireless data networks, for example WiFi™ and 3G/4G/5G cellular networks. The term "computer-readable signal medium" can further be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor. While embodiments have been described in detail above, these embodiments are non-limiting and should be considered as merely exemplary. Modifications and extensions may be developed, and all such modifications are deemed to be within the scope defined by the appended claims.

What is claimed is:

1. A method of controlling use of network-connectable devices, the method comprising:
   receiving from a plurality of user devices a plurality of network destinations accessed by the plurality of user devices;
   receiving ages of users of the plurality of user devices;
   training a first classifier based on the plurality of network destinations and the ages of the users of the plurality of user devices;
   receiving an age of a first user of a particular user group;
   monitoring a first user device via a first application executed by at least one processor of the first user device, the first user device assigned to the particular user group;
   determining via the first application a first time of use on the first user device and first network destinations accessed by the first user device;
   applying the first classifier to the first network destinations to determine a first age range;
   comparing the first age range and the age of the first user to determine the age of the first user is within the first age range;
   determining a use time of the first user based at least on the first time of use on the first user device and the determining the age of the first user is within the first age range; and
   disabling a functional component of the first user device based at least on the use time of the first user.

2. The method of claim 1, further comprising:
   monitoring a second user device via a second application executed by at least one processor of the second user device, the second user device assigned to the particular user group;
   determining via the second application a second time of use on the second user device and second network destinations accessed by the second user device;
   applying the first classifier to the second network destinations to determine a second age range at least one of equal to or overlapping with the first age range;
   comparing the second age range and the age of the first user to determine the age of the first user is within the second age range; and
   determining the use time of the first user further based at least on the second time of use on the second user device and the determining the age of the first user is within the second age range.

3. The method of claim 2, further comprising determining the use time of the first user as a sum of the first time of use on the first user device and the second time of use on the second user device.

4. The method of claim 1, further comprising:
   receiving an indication that a second user device assigned to the particular user group is operated by the first user;
   monitoring the second user device via a second application executed by at least one processor of the second user device, the second user device assigned to the particular user group;
   determining via the second application a second time of use on the second user device; and
   determining the use time of the first user further based on the second time of use on the second user device.

5. The method of claim 4, further comprising determining the use time of the first user as a sum of the first time of use on the first user device and the second time of use on the second user device.

6. The method of claim 1, further comprising:
   receiving an indication that a second user device assigned to the particular user group is operated by the first user;
   monitoring the second user device via a second application executed by at least one processor of the second user device, the second user device assigned to the particular user group;
   determining via the second application a second time of use on the second user device and second network destinations accessed by the second user device;
   training a second classifier based at least on the second network destinations;
   applying the second classifier to the first network destinations to predict use by the first user of the first user device; and
   determining the use time of the first user further based on the use by the first user of the first user device predicted by the second classifier.

7. The method of claim 1, further comprising:
   monitoring a second user device via a second application executed by at least one processor of the second user device, the second user device assigned to the particular user group;
   determining via the second application a second time of use on the second user device and second network destinations accessed by the second user device, the particular user group further comprising a second user;
   receiving an age of the second user;
   applying the first classifier to the second network destinations to determine a second age range;
   comparing the second age range and the age of the second user to determine the age of the second user is within the second age range;
   determining a use time of the second user based at least on the second time of use on the second user device and the determining the age of the second user is within the second age range; and
   disabling a functional component of the second user device based at least on the use time of the second user.

8. The method of claim 7, further comprising:
   determining via the second application a third time of use on the second user device and third network destinations accessed by the second user device;
   applying the first classifier to the third network destinations to determine a third age range, the third age range at least one of equal to or overlapping with the first age range;
   comparing the third age range and the age of the first user; and
   determining the use time of the first user further based on the third time of use on the second user device and the comparing of the third age range and the age of the first user.

9. The method of claim 8, further comprising determining the use time of the first user as a sum of the first time of use on the first user device and the third time of use on the second user device.

10. The method of claim 7, further comprising:
receiving an indication that a third user device assigned to the particular user group is operated by the first user;
receiving from the third user device a third time of use on the third user device and third network destinations accessed by the third user device;
training a second classifier based at least on the third network destinations and the age of the first user;
applying the second classifier to the first network destinations to predict use by the first user of the first user device; and
determining the use time of the first user further based on the use by the first user of the first user device predicted by the second classifier.

11. The method of claim 7, wherein the first age range is at least one of equal to or overlapping with the second age range, the method further comprising determining the use time of the first user further based on the second time of use on the second user device and the second age range.

12. The method of claim 11, wherein the age of the first user is within the first age range and the second age range, the method further comprising:
determining the use time of the first user to comprise a first portion of the second time of use on the second user device; and
determining the use time of the second user to comprise a second portion of the second time of use on the second user device.

13. The method of claim 11, wherein the age of the first user is within the first age range and the second age range, the method further comprising determining the use time of the first user further based on the second time of use on the second user device and the second age range, wherein the use time of the first user comprises the second time of use on the second user device, and wherein the use time of the second user comprises the second time of use on the second user device.

14. The method of claim 7, wherein the first age range is at least one of equal to or overlapping with the second age range, the method further comprising:
transmitting a request via a network to a third user;
receiving from the third user an indication that the first user is a user of the first user device; and
determining the use time of the first user further based on receiving the indication that the first user is the user of the first user device.

15. The method of claim 1, wherein the plurality of network destinations comprise a uniform resource locator ("URL") clickstream.

16. The method of claim 1, wherein the plurality of network destinations comprise a domain name server ("DNS") clickstream.

17. The method of claim 1, wherein training the first classifier comprises:
providing the plurality of network destinations as inputs to the first classifier; and
providing the ages of the users of the plurality of user devices as outputs of the first classifier.

18. The method of claim 1, wherein applying the first classifier to the first network destinations comprises inputting the first network destinations to the first classifier to output the first age range.

19. The method of claim 1, further comprising:
receiving genders of the users of the plurality of user devices;
training the first classifier further based on the genders of the users;
receiving a gender of the first user;
applying the first classifier further to determine a sex;
comparing the gender of the first user and the determined sex; and
determining the use time of the first user further based on the comparing the gender of the first user and the determined sex, the gender of the first user being the same as the sex determined by the first classifier.

20. The method of claim 1, further comprising:
receiving an indication of a location of the first user device;
monitoring by a mobile device assigned to the first user a location of the mobile device assigned to the first user; and
determining the use time of the first user further based on the location of the first user device relative to the location of the mobile device.

21. The method of claim 20, further comprising:
determining a distance between the location of the first user device and the location of the mobile device; and
applying the first time of use to the use time of the first user responsive to the distance between the location of the first user device and the location of the mobile device being less than a particular threshold distance.

22. The method of claim 1, further comprising:
monitoring a second user device via a second application executed by at least one processor of a router connected to the second user device via a network, the second user device assigned to the particular user group;
determining via the second application a second time of use on the second user device and second network destinations accessed by the second user device;
applying the first classifier to the second network destinations to determine a second age range at least one of equal to or overlapping with the first age range;
comparing the second age range and the age of the first user to determine the age of the first user is within the second age range; and
determining the use time of the first user further based at least on the second time of use on the second user device and the determining the age of the first user is within the second age range.

23. The method of claim 1, further comprising:
detecting at least a first time stamp based on the monitoring; and
determining the first time of use based on the at least the first time stamp.

24. The method of claim 1, further comprising:
receiving from the plurality of user devices a plurality of time stamps;
training the first classifier further based on the plurality of time stamps;
detecting at least a first time stamp based on the monitoring; and
applying the first classifier further to the at least the first time stamp to determine the first age range.

* * * * *